United States Patent
Chae et al.

(10) Patent No.: US 10,111,024 B2
(45) Date of Patent: Oct. 23, 2018

(54) METHOD AND APPARATUS FOR AN INPUT DATA PROCESSING VIA A LOCAL COMPUTING OR OFFLOADING BASED ON POWER HARVESTING IN A WIRELESS COMMUNICATION SYSTEM

(71) Applicant: LG ELECTRONICS INC., Seoul (KR)

(72) Inventors: Hyukjin Chae, Seoul (KR); Kaibin Huang, Hong Kong (CN); Changsheng You, Hong Kong (CN)

(73) Assignee: LG ELECTRONICS INC., Seoul (KR)

( * ) Notice: Subject to any disclaimer, the term of this patent is extended or adjusted under 35 U.S.C. 154(b) by 156 days.

(21) Appl. No.: 15/207,081

(22) Filed: Jul. 11, 2016

(65) Prior Publication Data
US 2017/0013495 A1   Jan. 12, 2017

Related U.S. Application Data

(60) Provisional application No. 62/190,745, filed on Jul. 10, 2015.

(51) Int. Cl.
| | |
|---|---|
| *H04W 4/00* | (2018.01) |
| *H04W 52/02* | (2009.01) |
| *H04W 52/38* | (2009.01) |
| *H04W 52/14* | (2009.01) |
| *H04W 52/34* | (2009.01) |
| *H04B 17/391* | (2015.01) |

(Continued)

(52) U.S. Cl.
CPC ........ *H04W 4/006* (2013.01); *H04B 17/3911* (2015.01); *H04W 4/38* (2018.02); *H04W 52/0206* (2013.01); *H04W 52/0216* (2013.01); *H04W 52/0229* (2013.01); *H04W 52/0296* (2013.01); *H04W 52/143* (2013.01); *H04W 52/343* (2013.01); *H04W 52/383* (2013.01); *H04W 76/14* (2018.02); *H04W 28/08* (2013.01); *Y02D 70/00* (2018.01); *Y02D 70/1224* (2018.01); *Y02D 70/1242* (2018.01); *Y02D 70/1262* (2018.01); *Y02D 70/1264* (2018.01); *Y02D 70/142* (2018.01); *Y02D 70/146* (2018.01); *Y02D 70/21* (2018.01); *Y02D 70/23* (2018.01)

(58) Field of Classification Search
CPC ........................ H04W 4/006; H04B 17/3911
See application file for complete search history.

(56) References Cited

U.S. PATENT DOCUMENTS

| | | | | |
|---|---|---|---|---|
| 2012/0324259 | A1* | 12/2012 | Aasheim | G06F 1/3206 713/320 |
| 2015/0312831 | A1* | 10/2015 | Sang | H04W 36/0083 370/236 |

OTHER PUBLICATIONS

Zhou (X. Zhou, Wireless Information and Power Transfer: Architecture Design and Rate-Energy Tradeoff; IEEE Transactions on Communication,. 2013).*

(Continued)

*Primary Examiner* — Michael Thier
*Assistant Examiner* — Zhensheng Zhang
(74) *Attorney, Agent, or Firm* — Birch, Stewart, Kolasch & Birch, LLP

(57) ABSTRACT

One embodiment of the present invention relates to a method for receiving signal from BS (Base station) and saving energy that is delivered via the signal; determining whether a local computing is feasible and whether an offloading is feasible; and performing one of the local computing or the offloading according to the determination.

12 Claims, 9 Drawing Sheets

(51) Int. Cl.
    *H04W 4/38*    (2018.01)
    *H04W 76/14*   (2018.01)
    *H04W 28/08*   (2009.01)

(56) References Cited

OTHER PUBLICATIONS

Benini et al., "Policy Optimization for Dynamic Power Management," IEEE Transactions on Computer-Aided Design of Integrated Circuits and Systems, vol. 18, No. 6, Jun. 1999, pp. 813-833.
Bi et al., "Wireless Powered Communication: Opportunities and Challenges," IEEE Communications Magazine, Apr. 2014, pp. 1-19.
Brown, "The History of Power Transmission by Radio Waves," IEEE Transactions on Microwave Theory and Techniques, vol. MTT-32, No. 9, Sep. 1984, pp. 1230-1242.
Burd et al., "Processor Design for Portable Systems," Journal of VLSI Signal Processing Systems, Aug. 1996, pp. 203-221 (25 pages).
Cuervo et al., "MAUI: Making Smartphones Last Longer with Code Offload," Proceedings of the 8th International Conference on Mobile Systems, Applications, and Services, Jun. 2010, pp. 49-62 (14 pages).
Dinh et al., "A survey of mobile cloud computing: architecture, applications, and approaches," Wireless Communications and Mobile Computing, vol. 13, No. 18, Dec. 25, 2013, pp. 1587-1611 (25 pages).
Gkatzikis et al., "Migrate or Not? Exploiting Dynamic Task Migration in Mobile Cloud Computing Systems," IEEE Wireless Communications, vol. 20, No. 3, Jun. 2013, pp. 24-32 (24 pages).
Gurakan et al., "Energy Cooperation in Energy Harvesting Communications," Proceedings of the IEEE International Symposium on Information Theory, 2012, pp. 965-969 (30 pages).
Huang et al., "A Dynamic Offloading Algorithm for Mobile Computing," IEEE Transactions on Wireless Communications, vol. 11, No. 6, Jun. 2012, pp. 1991-1995.
Huang et al., "Cutting Last Wires for Mobile Communications by Microwave Power Transfer," IEEE Communications Magazine, vol. 53, No. 6, Jun. 2015, pp. 86-93 (11 pages).
Huang et al., "Enabling Wireless Power Transfer in Cellular Networks: Architecture, Modeling and Deployment," IEEE Transactions on Wireless Communications, vol. 13, Feb. 2014, pp. 902-912 (25 pages).
Kosta et al., "ThinkAir: Dynamic resource allocation and parallel execution in cloud for mobile code offloading," INFOCOM, 2012 Proceedings of IEEE, Mar. 2012, pp. 945-953 (9 pages).
Kumar et al., "Cloud Computing for Mobile Users: Can Offloading Computation Save Energy?," Computer, vol. 43, No. 4, Apr. 2010, pp. 51-56.
Lee et al., "Opportunistic Wireless Energy Harvesting in Cognitive Radio Networks," IEEE Transactions on Wireless Communications, vol. 12, Sep. 2013, pp. 4788-4799 (14 pages).
Lorch et al., "Improving Dynamic Voltage Scaling Algorithms with PACE," Proceedings of the 2001 ACM Sigmetrics International Conference on Measurement and Modeling of Computer Systems, vol. 29, Jun. 2001, pp. 50-61 (12 pages).
Nasir et al., "Relaying Protocols for Wireless Energy Harvesting and Information Processing," IEEE Transactions on Wireless Communications, vol. 12, No. 7, Jul. 2013, pp. 3622-3636 (31 pages).
Ng et al., "Wireless Information and Power Transfer: Energy Efficiency Optimization in OFDMA Systems," IEEE Transactions on Wireless Communications, vol. 12, No. 12, Dec. 2013, pp. 6352-6370 (19 pages).
Ozel et al., "Transmission with Energy Harvesting Nodes in Fading Wireless Channels: Optimal Policies," IEEE Journal on Selected Areas in Communications, vol. 29, Aug. 2011, pp. 1732-1743 (25 pages).
Pillai et al., "Real-Time Dynamic Voltage Scaling for Low-Power Embedded Operating Systems," ACM SIGOPS Operating Systems Review, vol. 35, Dec. 2001, pp. 89-102 (14 pages).
Popovski et al., "Interactive Joint Transfer of Energy and Information," IEEE Transactions on Communications, vol. 61, No. 5, May 2013, pp. 2086-2097 (29 pages).
Prabhakar, "Energy-Efficient Transmission over a Wireless Link via Lazy Packet Scheduling," Proceedings of IEEE Infocom, vol. 1, 2001, pp. 386-394.
Sardellitti et al., "Joint Optimization of Radio and Computational Resources for Multicell Mobile-Edge Computing," IEEE Transactions on Signal and Information Processing over Networks, vol. 1, No. 2, Jun. 2015, pp. 1-13.
Shi et al., "COSMOS: Computation Offloading as a Service for Mobile Devices," Proceedings of the 20th International Symposium on Mobile Ad Hoc Networking and Computing, Aug. 2014, pp. 287-296 (10 pages).
Yao et al., "A Scheduling Model for Reduced CPU Energy," Proceedings of the 36th Annual IEEE Symposium on Foundations of Computer Science, 1995, pp. 374-382.
Yuan et al., "Energy-Efficient Soft Real-Time CPU Scheduling for Mobile Multimedia Systems," ACM Transactions on Computer Systems, vol. 37, No. 5, 2003, pp. 149-163 (15 pages).
Zhang et al., "Energy-Optimal Mobile Cloud Computing under Stochastic Wireless Channel," IEEE Transactions on Wireless Communications, vol. 12, No. 9, Sep. 2013, pp. 4569-4581.
Zhang et al., "MIMO Broadcasting for Simultaneous Wireless Information and Power Transfer," IEEE Transactions on Wireless Communications, vol. 12, May 2013, pp. 1989-2001 (29 pages).
Zhang et al., "To offload or not to offload: an efficient code partition algorithm for mobile cloud computing," IEEE 1st International Conference on Cloud Networking (CLOUDNET), Nov. 2012, pp. 80-86 (7 pages).

* cited by examiner

FIG. 6
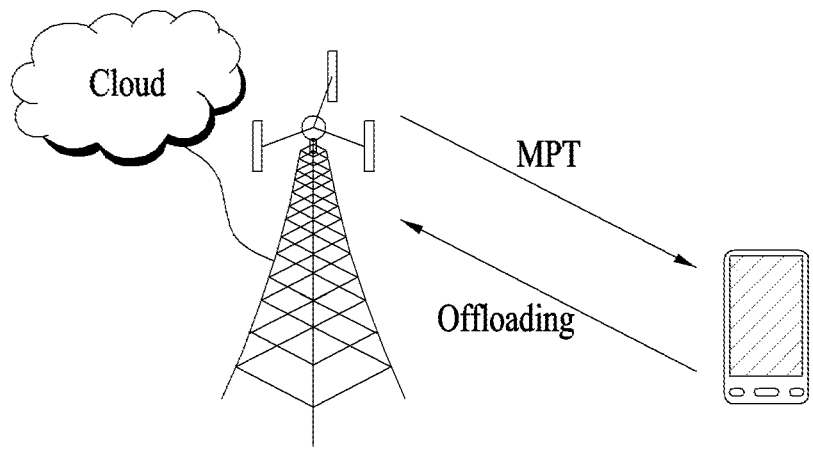
(a) Wirelessly powered mibile cloud computing system
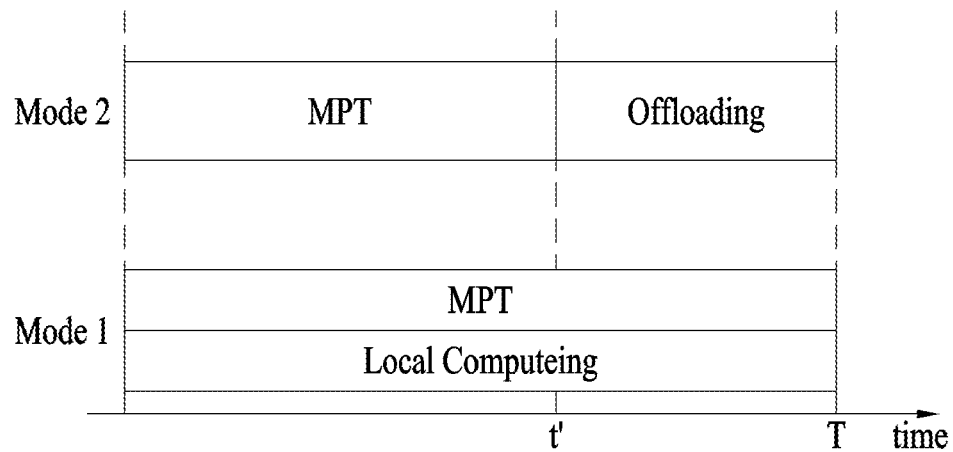
(b) Mobile operation mode Energy savings vs. BS transmission power for local computing.

Energy savings vs. BS transmission power for offloading

Minimum required BS transmission power vs. deadilne for the local computing and offloading with L = 1000 bits and B = 1Mhz.

Offloading gain for the local computing and offloading.

Successful computing probability for local computing with dynamic channels.

Successful computing probability for offloading with dynamic channels

METHOD AND APPARATUS FOR AN INPUT DATA PROCESSING VIA A LOCAL COMPUTING OR OFFLOADING BASED ON POWER HARVESTING IN A WIRELESS COMMUNICATION SYSTEM

CROSS REFERENCE TO RELATED APPLICATION

This non-provisional application claims the benefit under 35 U.S.C. § 119(e) to U.S. Provisional Application No. 62/190,745, filed on Jul. 10, 2015, which is hereby expressly incorporated by reference into the present application.

TECHNICAL FIELD

The present invention relates to a wireless communication system, and more particularly, to a method and apparatus for local computing or offloading based on power harvesting.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

D2D communication is a communication scheme in which a direct link is established between User Equipments (UEs) and the UEs exchange voice and data directly with each other without intervention of an evolved Node B (eNB). D2D communication may cover UE-to-UE communication and peer-to-peer communication. In addition, D2D communication may find its applications in Machine-to-Machine (M2M) communication and Machine Type Communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, the overhead of a network may be reduced. Further, it is expected that the introduction of D2D communication will reduce the power consumption of devices participating in D2D communication, increase data transmission rates, increase the accommodation capability of a network, distribute load, and extend cell coverage.

DISCLOSURE OF THE INVENTION

Technical Task

The technical task of the present invention is to provide optimized solutions for Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In a first technical aspect of the present invention, provided herein is for a method of an input data processing via a local computing or offloading based on power harvesting by a user equipment (UE) in a wireless communication system, the method comprising, receiving signal from BS (Base station) and saving energy that is delivered via the signal; determining whether a local computing is feasible and whether an offloading is feasible; and performing one of the local computing or the offloading according to the determination.

In a second technical aspect of the present invention, provided herein is a user equipment (UE) processes an input data via a local computing or offloading based on power harvesting in a wireless communication system, comprising: a receiving device; and a processor, wherein the processor is configured to receives signal from BS (Base station) and saving energy that is delivered via the signal, determines whether a local computing is feasible and whether an offloading is feasible; and performs one of the local computing or the offloading according to the determination.

The UE determines the local computing is feasible when following equation is met:

$$a \le P_b h$$

wherein h is the channel gain, $P_b$ is BS transmission power and $$a = \frac{\gamma N^3}{\upsilon T^3},$$

N is upper bounds the number of CPU cycles, $\gamma$ is a constant determined by the switched capacitance, $\upsilon$ represents the energy conversion efficiency, B is a channel bandwidth, T is time duration for receiving the signal and offloading.

The UE calculate an input data, when the UE determines the local computing.

The UE determines the offloading is feasible when following equation is met:

$$P_b h^2 \ge a''$$

wherein h is the channel gain, $P_b$ is BS transmission power and $$a'' = \frac{\sigma^2}{\upsilon}\left\{1 + \left[\frac{L\ln 2}{BT} + W\left(-e^{-1-\frac{L\ln 2}{BT}}\right)\right] \times \exp\left(\frac{L\ln 2}{BT} + W\left(-e^{-1-\frac{L\ln 2}{BT}}\right) + 1\right)\right\},$$

$\sigma^2$ is the variance of complex white Gaussian noise, $\upsilon$ represents the energy conversion efficiency, B is a channel bandwidth, T is time duration for receiving the signal and offloading, L is the number of bits of input data for computation, W is a Lambert function defined as the solution for $W(x)e^{W(x)}=x$.

If both the local computing and the offloading are feasible, the method further comprising:
comparing energy saving of the local computing and energy saving of the offloading.

The comparing energy saving is represented as $$\Delta S = \frac{\gamma\theta}{T^2} - y(h)L,$$

wherein coefficient θ satisfies $$\left(\sum_{k=1}^{N} p_k^{\frac{1}{3}}\right)^3 \le \theta \le N^2 \sum_{k=1}^{N} p_k,$$

$$y(h) = \left(\frac{\sigma^2}{Bh}\ln 2\right)\exp\left(W\left(\frac{\upsilon P_b h^2}{\sigma^2 e} - \frac{1}{e}\right) + 1\right),$$

h is the channel gain, $P_b$ is BS transmission power, $\sigma^2$ is the variance of complex white Gaussian noise, υ represents the energy conversion efficiency, B is a channel bandwidth, W is a Lambert function defined as a solution for $W(x)e^{W(x)}=x$, N is upper bounds the number of CPU cycles, $p_k$ is the probability that the k-th CPU cycle is executed.

The offloading is selected after comparing energy saving, when one of following condition is met:

$$T \le \frac{\gamma\theta}{y(h)L} \text{ or } P_b \le \frac{\sigma^2}{\upsilon h^2}(1 + ea'''\ln a'''),$$

T is time duration for receiving the signal and offloading, L is the number of bits of input data for computation, $$a''' = \frac{Bh\gamma\theta}{eT^2\sigma^2 L\ln 2},..$$

Advantageous Effects

According to the present invention, a D2D user equipment can reduce frequency offset when obtaining synchronization.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 6 illustrates wirelessly powered mobile cloud computing system and Mobile operation modes.

DETAILED DESCRIPTION OF THE INVENTION

Figure 1:
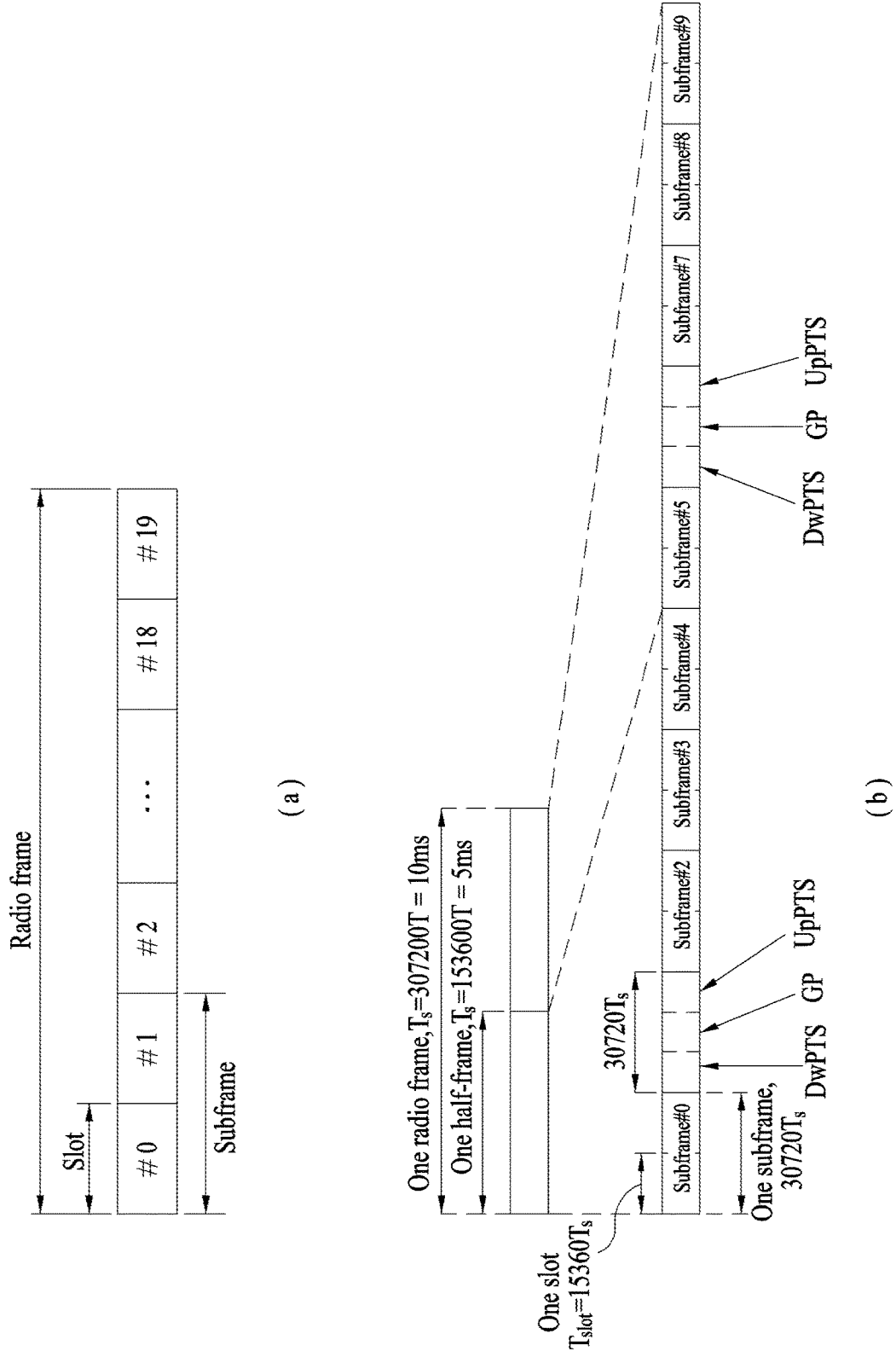
FIG. 1 illustrates a radio frame structure.

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment.

Embodiments of the present invention will be described, focusing on a data communication relationship between a base station and a terminal. The base station serves as a terminal node of a network over which the base station directly communicates with the terminal. Specific operations illustrated as being conducted by the base station in this specification may also be conducted by an upper node of the base station, as necessary.

In other words, it will be obvious that various operations allowing for communication with the terminal in a network composed of several network nodes including the base station can be conducted by the base station or network nodes other than the base station. The term "base station (BS)" may be replaced with terms such as "fixed station," "Node-B," "eNode-B (eNB)," and "access point". The term "relay" may be replaced with such terms as "relay node (RN)" and "relay station (RS)". The term "terminal" may also be replaced with such terms as "user equipment (UE)," "a mobile station (MS)," "mobile subscriber station (MSS)" and "subscriber station (SS)".

It should be noted that specific terms disclosed in the present invention are proposed for convenience of description and better understanding of the present invention, and these specific terms may be changed to other formats within the technical scope or spirit of the present invention.

In some cases, known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention are supported by standard documents disclosed for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described in the embodiments of the present invention to prevent obscuring the technical spirit of the present invention, may be supported by the above documents. All terms used herein may be supported by the above-mentioned documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through wireless technologies such as universal terrestrial radio access (UTRA) or CDMA2000. TDMA may be embodied through wireless technologies such as global system for mobile communication (GSM)/general packet radio service (GPRS)/enhanced data rates for GSM evolution (EDGE). OFDMA may be embodied through wireless technologies such as IEEE 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on 3GPP LTE and 3GPP LTE-A systems. However, the spirit of the present invention is not limited thereto.

LTE/LTE-A Resource Structure/Channel

Hereinafter, a radio frame structure will be described with reference to FIG. 1.

In a cellular OFDM wireless packet communication system, an uplink (UL)/downlink (DL) data packet is transmitted on a subframe basis, and one subframe is defined as a predetermined time interval including a plurality of OFDM symbols. 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into ten subframes. Each subframe includes two slots in the time domain. The time taken to transmit one subframe is defined as a transmission time interval (TTI). For example, a subframe may have a duration of 1 ms and one slot may have a duration of 0.5 ms. A slot may include a plurality of OFDM symbols in the time domain and includes a plurality of resource blocks (RBs) in the frequency domain. Since 3GPP LTE adopts OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol extends and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other three OFDM symbols may be allocated to a physical downlink shared channel (PDSCH).

FIG. 1(b) illustrates the type-2 radio frame structure. The type-2 radio frame includes two half frames, each of which has 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and UL transmission synchronization in a UE. The GP is provided to eliminate interference taking place in UL due to multipath delay of a DL signal between DL and UL. Regardless of the type of a radio frame, a subframe of the radio frame includes two slots.

Herein, the illustrated radio frame structures are merely examples, and various modifications may be made to the number of subframes included in a radio frame, the number of slots included in a subframe, or the number of symbols included in a slot.

Figure 2:
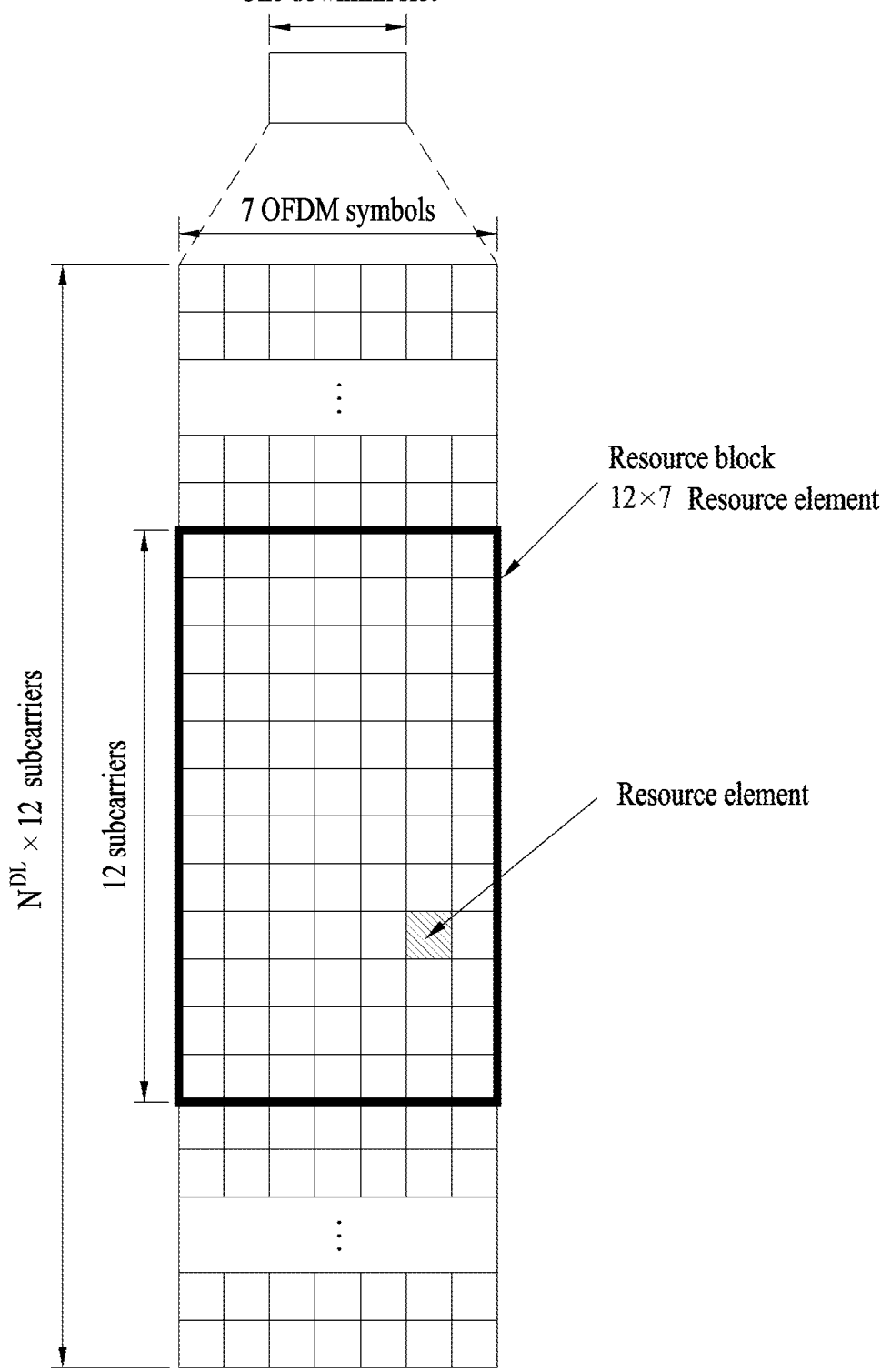
FIG. 2 illustrates a structure of a downlink resource grid for the duration of one downlink slot.

FIG. 2 is a diagram illustrating a resource grid for one DL slot. A DL slot includes 7 OFDM symbols in the time domain and an RB includes 12 subcarriers in the frequency domain. However, embodiments of the present invention are not limited thereto. For a normal CP, a slot may include 7 OFDM symbols. For an extended CP, a slot may include 6 OFDM symbols. Each element in the resource grid is referred to as a resource element (RE). An RB includes 12×7 REs. The number $N_{DL}$ of RBs included in a downlink slot depends on a DL transmission bandwidth. A UL slot may have the same structure as a DL slot.

Figure 3:
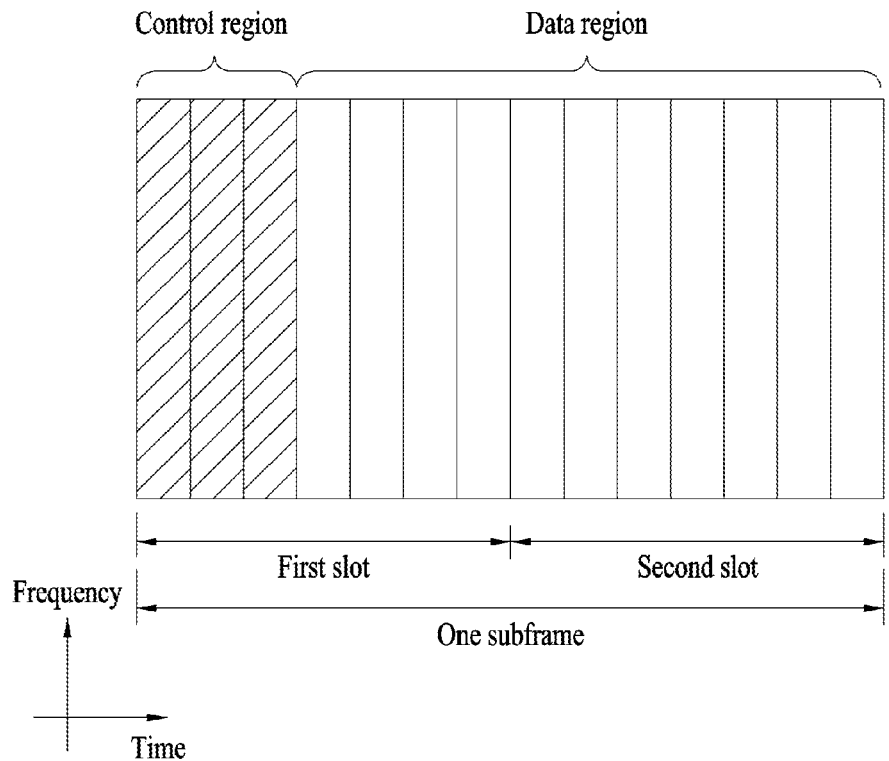
FIG. 3 illustrates a structure of a downlink subframe.

FIG. 3 illustrates a DL subframe structure. Up to the first three OFDM symbols of the first slot in a DL subframe used as a control region to which control channels are allocated and the other OFDM symbols of the DL subframe are used as a data region to which a PDSCH is allocated. DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted at the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or UL transmission power control commands for UE groups. The PDCCH delivers information about resource allocation and a transport format for a DL shared channel (DL-SCH), resource allocation information about an UL shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, and voice over Internet protocol (VoIP) activation information. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined depending on the correlation between the number of CCEs and a coding rate provided by the CCEs. An eNB determines the PDCCH format according to DCI transmitted to a UE and adds a cyclic redundancy check (CRC) to the control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator identifier (P-RNTI). If the PDCCH delivers system information, particularly, a system information block (SIB), the CRC thereof may be masked by a system information ID and a system information RNTI (SI-RNTI). To indicate that the PDCCH delivers a random access response in response to a random access preamble transmitted by a UE, the CRC thereof may be masked by a random access-RNTI (RA-RNTI).

Figure 4:
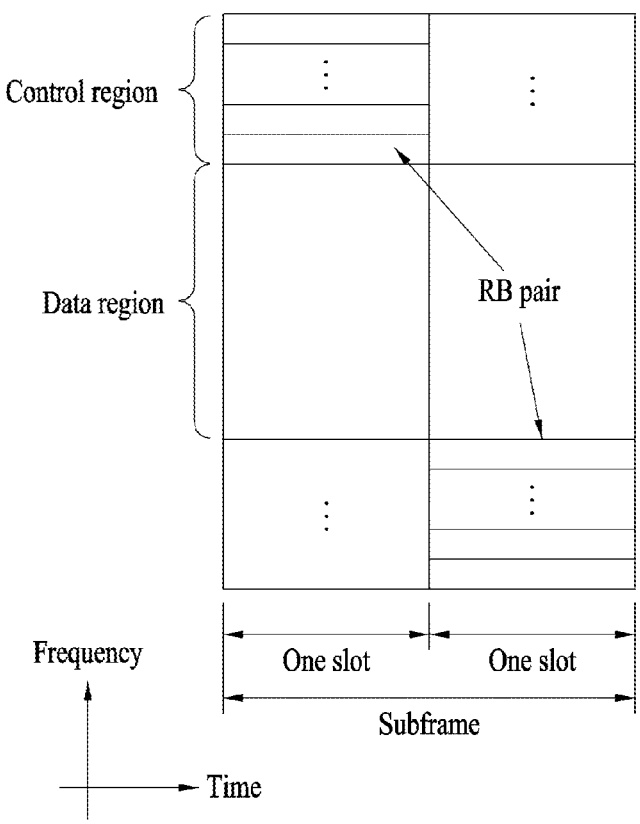
FIG. 4 illustrates a structure of an uplink subframe.

FIG. 4 illustrates a UL subframe structure. A UL subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs of the RB pair occupy different subcarriers in two slots. This is often called frequency hopping of the RB pair allocated to the PUCCH over a slot boundary.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting Inter-Cell Interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a Synchronization Reference Node (SRN, also referred to as a synchronization source)) may transmit a D2D Synchronization Signal (D2DSS) and the remaining UEs may transmit and receive signals in synchronization with the D2DSS.

D2DSSs may include a Primary D2DSS (PD2DSS) or a Primary Sidelink Synchronization Signal (PSSS) and a Secondary D2DSS (SD2DSS) or a Secondary Sidelink Synchronization Signal (SSSS). The PD2DSS may be configured to have a similar/modified/repeated structure of a Zadoff-chu sequence of a predetermined length or a Primary Synchronization Signal (PSS), and the SD2DSS may be configured to have a similar/modified/repeated structure of an M-sequence or a Secondary Synchronization Signal (SSS). If UEs synchronize their timing with an eNB, the eNB serves as an SRN and the D2DSS is a PSS/SSS. A Physical D2D Synchronization Channel (PD2DSCH) may be a (broadcast) channel carrying basic (system) information that a UE should first obtain before D2D signal transmission and reception (e.g., D2DSS-related information, a Duplex Mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 5:
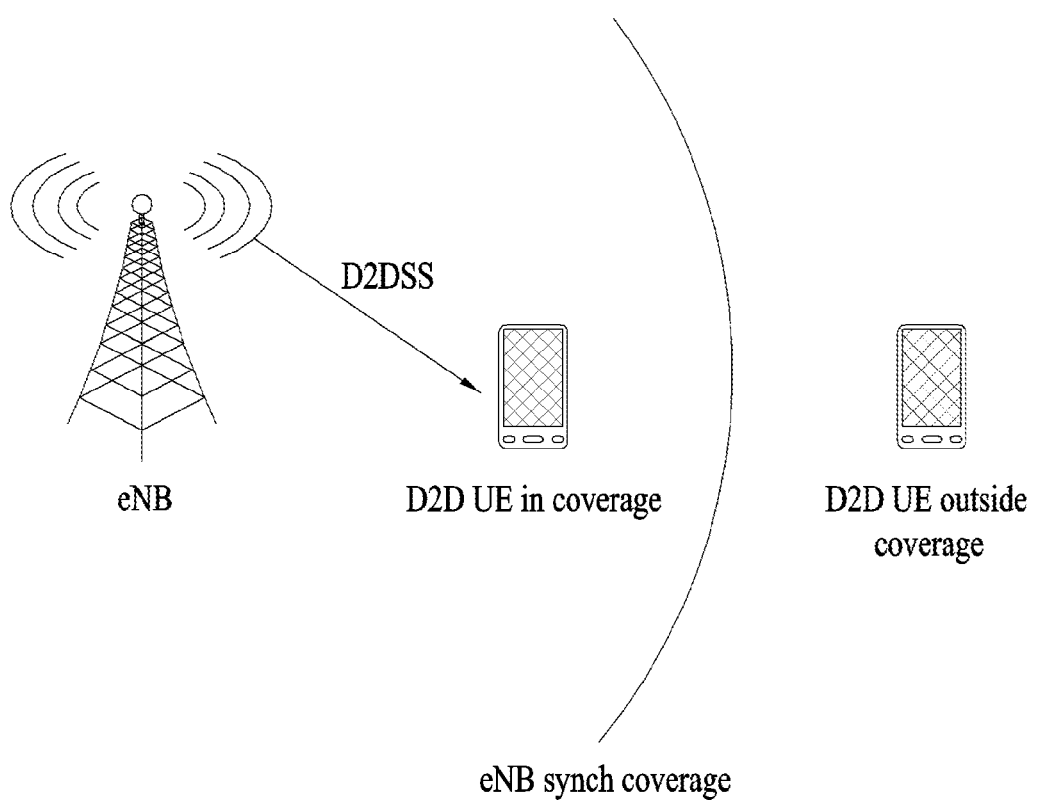
FIG. 5 illustrates relay of a synchronization signal.

In a situation illustrated in FIG. 5, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct Amplify-and-Forward (AF)-relay of an SS transmitted by an eNB. As the D2DSS is relayed, an in-coverage UE may communicate directly with an out-of-coverage UE. FIG. 5 illustrates an exemplary case in which a D2DSS is relayed and communication is conducted between D2D UEs based on the relayed D2DSS.

Achieving long battery lives or even self sustainability has been a long standing challenge for designing mobile devices. This invention seamlessly integrates the mobile local computing with two promising energy-saving technologies, namely mobile computation offloading (MCO) and microwave power transfer (MPT), and proposes a novel design framework of wirelessly powered mobile cloud computing (MCC). Consider a single-user system where a base station (BS) either transfers power to or offloads computation from a mobile. For two mobile operation modes, namely local computing and offloading, the successful computing probability (SCP) maximization problem in Rician distributed fading channels is converted to maximize the mobile energy savings given two channel realizations: static channels and dynamic channels.

First, consider the static channels. For local computing, the non-convex problem of optimizing the CPU-cycle frequencies under the deadline and energy causality constraints is solved via convex relaxation. For offloading, the time duration before the deadline is divided for separate MPT and offloading and the optimal division is derived in a closed form. Moreover, the successful computing conditions of channels gain for both operation modes are derived, resulting in the expression of SCP. The above results are combined for making offloading decision with static channels. Next, for dynamic channels, the master-and-slave model is applied to optimize the control policies for both local computing and offloading, where the slave problem for maximizing the mobile energy savings during one fading block is solved by a procedure similar to that of static channels and the master problem for data allocation over different fading blocks is addressed with approximation techniques, resulting in the sub-optimal but simple solution.

The explosive growth of Internet of Things and mobile communication is leading to the deployment of tens of billions of sensors and mobile devices in near future. Prolonging their battery lives and enhancing their computing capabilities are two key design challenges. They can be tackled by two promising technologies: one is to power the sensors and mobiles by wireless power transfer using microwaves, called microwave power transfer (MPT) [3], and the other is to offload computation-intensive tasks from the mobiles to the cloud, called mobile computation offloading (MCO) [4]. These two separately developed technologies are seamlessly integrated with mobile local computing in the current work to develop a novel design framework of wirelessly powered mobile cloud computing (MCC).

MCO has been an active research area in computer science [4] where research has focused on designing mobile-cloud system and software architectures [20, 9, 26], virtual machine migration design in the cloud [5] and code partitioning techniques in the mobile [20, 16] for reducing the energy consumption and improving the computation performance of mobiles. Nevertheless, implementation of MCO requires data transmission and message passing over wireless channels, incurring transmission power consumption [22]. The existence of such a tradeoff has motivated cross-disciplinary research on jointly designing MCO and adaptive transmission algorithms to maximize the mobile energy savings [21, 1]. A stochastic control algorithm was proposed in [21] for adapting the offloaded component of an application to a time-varying wireless channel. Furthermore, computation offloading design for multiuser in a multi-cell system was explored in [1], where both the radio and computational resources were optimized for the maximum energy savings under the latency constraints.

An alternative method for MCO is mobile local computing, for which, the energy-efficient techniques have been investigated for many years [15, 2, 13]. The scheduling of multiple computation tasks was optimized in [15] to balance the workload for energy savings. Dynamic power management (DPM), which was proposed in [2], applied dynamic reconfiguration for computing components by selectively turning off. Furthermore, a recognized mechanism, namely dynamic voltage scaling (DVS) [13], made a breakthrough for CPU energy savings, where the CPU cycle frequencies were controlled via the voltage scaling. Recently, the result of DVS is applied to optimize the mobile cloud offloading decision given a stochastic wireless channel in [28].

Prior work assumes stable power supplies for mobiles but MCC is powered by MPT in this invention that introduces new design challenges. Among others, a key challenge is that the algorithms for the local computing and offloading must be designed under the energy causality constraints that arise from energy harvesting and prevent energy consumption from exceeding the amount of harvested energy at every time instant [12].

The MPT technology has been developed for point-to-point high power transmission in the past decades [3]. Recently, the technology is being further developed to power wireless communications. This has resulted in the emergence of an active field called simultaneous wireless information and power transfer (SWIPT). Various SWIPT techniques have been developed by integrating MPT with communication techniques including MIMO transmission [17], OFDMA [11], two-way communication [25] and relaying [24, 6]. Furthermore, existing wireless networks such as cognitive radio [10] and cellular networks [8] have been redesigned to feature MPT. Recent advancements on SWIPT are surveyed in [18] and [7]. Most prior work on SWIPT aims at optimizing communication techniques to maximize the MPT efficiency and system throughput. In contrast, the current work focuses on optimizing the local computing and offloading under a different design criterion of successful computing probability (SCP).

The invention proposes a novel system comprising a single multi-antenna base station (BS) beaming power to a half-duplex single-antenna mobile as well as relaying offloaded data from the mobile to the cloud. Effective transmit and receive beamforming is applied to BS, resulting in a single-input-single-out (SISO) Rician distributed fading channel. The task for the mobile is to process a fixed amount of data under the deadline and energy causality constraints. Therefore, the successful computing probability (SCP) of the two mobile operation modes, namely local computing and offloading, with the distributed fading channel will be affected by the corresponding control policies. Due to the independency and identity of different channel realization, the SCP maximization problems are converted to maximize the energy savings for a given channel realization. Consider two kinds of channel realization: static channels and dynamic channels. Then the optimal control policies for local computing and offloading with such two channels are investigated in the followings.

First, consider static channels. The local computing has fixed harvested energy during the computing duration. Then, building on the framework proposed in [28], the mobile CPU-cycle frequencies are optimized for minimize the average energy consumption under the deadline and energy causality constraints. The corresponding optimization problem is non-convex but solved by convex relaxation and then its proving optimality. The successful local computing conditions for the BS transmission power and channel gain are derived in closed-form, leading to the expression of SCP. Under the successful computing condition, the resultant optimal CPU-cycle frequencies are derived as functions of the BS transmission power if it is below a given threshold and otherwise proved to be independent of the latter. Then, for offloading, the time duration before the deadline is divided into two halves for separate MPT and offloading. The time division is optimized for maximizing the mobile energy savings followed by the successful offloading condition and SCP expression. Moreover, for one channel realization, the above results are combined for making the optimal offloading decision based on whether the successful computing conditions are satisfied and which mode achieves a larger mobile energy savings.

Next, more complicated control policies are derived for MCC with dynamic block-fading channels. For local computing, due to the different time scale of CPU cycle realization and channel realization, a master-and-slave problem is applied for maximizing the overall mobile energy savings, where the master problem concerns about data allocation for different fading blocks and the CPU-cycle frequencies control is optimized in the slave problem. The slave problem is solved in a procedure which is similar to that of static channels. However, the derivation of the solution for the master problem is non-trivial. The challenges are described as follows. For one thing, the amount of energy delivered over fading blocks is uncertain which is determined by the computing control policies. For another, such residual energy in one fading block will in turn affect the optimal control policies and it decides the formulation of the energy savings in this block. Therefore, two approximation techniques for the residual energy and energy consumption in single fading block are performed to derive the sub-optimal data allocation policy. Then, the offloading case follows the local computing counterpart with a master-and-slave model. The optimal time division policies are obtained from the solution for the slave problem. As for the master problem, due to the high complexity and few insights of the optimal data allocation policy resulted from dynamic programming (DP), a sub-optimal but much simpler policy which has the greedy structure is derived with similar approximation techniques of local computing. The SCP for both operation modes in current case with Rician distributed channels have no closed forms but their performance is verified in the sequel simulation.

System Model

Consider a wirelessly powered mobile cloud computing system model shown in FIG. 6(a) comprising one single-antenna mobile and one multi-antenna base station (BS) that is a node of a cloud. The base station either transfers power wirelessly to or offloads computation from the mobile. The mobile has two operation modes corresponding to the local computing and offloading illustrated in FIG. 6(b). The local computing and MPT can be performed simultaneously while the offloading and MPT are non-overlapping in time assuming half-duplex transmission.

For efficient MPT, the channel between the $N_r$-antenna BS and mobile is modeled as a multiple-input-multiple-output Rician fading channel, where the channel gain h is a $N_r$-dimensional complex vector, given as equation 1

$$h = \sqrt{\frac{K}{1+K}}\bar{h} + \sqrt{\frac{1}{1+K}} h_w \qquad \text{[Equation 1]}$$

where K is the Rician factor, h is the LOS component and $h_w$ is a $N_r$-dimensional zero-mean unit-variance circularly symmetric complex Gaussian vector. MRT is applied in the BS such that it converts the downlink channel into a SISO channel with the effective channel gain denoted as h, given by h=∥h∥. Assuming channel reciprocity and applying MRC at BS result in an effective uplink channel with channel gain h. Moreover, for a given channel realization, consider two cases: static channels and dynamic channels. In static channels, the channel gain h is fixed during the whole time interval. While channel fading blocks are assumed for dynamic channels where the channel gain keeps constant in each fading block and varies from block to block, independently and identically.

Based on the common approach [27, 28], the local computing at the mobile is modeled as follows. Let L denote the number of bits of input data for computation and T represent the deadline for computing the data. Define CPU cycle information (CCI) as the number of CPU cycles required for computing 1-bit of input data. Then CCI can be modeled as a random variable denoted as X; LX gives the number of CPU cycles for computing L-bit input data [23]. Define $N_0$ as a positive integer such that $Pr(X>N_0) \le \varepsilon$ where $\varepsilon$ is a small real number: $0<\varepsilon<<1$. It follows that $Pr(LX>N) \le \varepsilon$ where $N=LN_0$. Then given L-bit input data, N upper bounds the number of CPU cycles in most cases. Define the probability $p_k=Pr(LX \ge k)$ with k=1, 2, ..., N. In other words, $p_k$ is the probability that the k-th cycle is executed. Note that the sequence $p_1, p_2, ..., p_N$ is monotone decreasing.

Next, the energy consumption for the local computing is modeled. In practice, mobile energy consumption is contributed by computation, transmission and fixed circuit power. The circuit power is omitted for simplicity but it can be accounted for by adding a constant in the problem formulation that, however, does not affect the solution method and key results. Let E(f) denote the amount of energy consumed for computation in a single CPU cycle executed at the frequency f (or equivalently having a CPU-cycle duration of 1/f). Following the model in [19], under the assumption of a low CPU voltage, $E(f)=\gamma f^2$ where $\gamma$ is a constant determined by the switched capacitance. Let $f_1, f_2, ..., f_N$ denote the CPU-cycle frequencies for CPU cycles 1, 2, ..., N, respectively.

An alternative for data processing is to offload it to the cloud by transmitting that data to the BS. Given mobile transmission power $P_t$, the capacity (in bit/s) of the channel between the mobile and the BS, denoted as R, is given as equation 2, $$R = B\log\left(1 + \frac{P_t h}{\sigma^2}\right) \qquad \text{[Equation 2]}$$

where B is the channel bandwidth and $\sigma^2$ is the variance of complex white Gaussian noise. Time is divided into slots with unit duration and let t denote the slot index. Channel variation is assumed to be slow such that h is constant with the computation duration of T slots. Moreover, it is assumed that the computation time in the cloud and the time for transmitting the computation result from the BS to the mobile are negligible since the cloud has practically infinite computation capability and the BS can afford high transmission power to reduce the downlink transmission delay. Last, the computation result is assumed to have a small size such that demodulating the data result at the mobile results in negligible energy consumption compared with that for local computing or offloading.

Last, the mobile is wirelessly powered by the BS with MPT as mentioned. Let $P_b$ denote the BS transmission power. The energy harvested by the mobile in one time unit is $\upsilon P_b h$ where the constant $0<\upsilon \le 1$ represents the energy conversion efficiency.

Assumption 1 The mobile has non-causal CSI and causal CCI.

Assumption 2 For dynamic channels, the number of channel realizations in the interval [0,T] is much smaller than the typical number of CPU cycles required for mobile local computing in the same interval.

Assumption 3 For dynamic channels, the input data can be divided continuously into parts that can be computed separately.

Non-causal CSI and causal CCI in Assumption 1 corresponds to the case where the mobile predicts channel variation or has a determined trajectory but it cannot pre-determined the required CPU cycle numbers for the input data. Assumption 2 states different time scales for channel variation and CPU cycles, allowing energy-efficient control policies to be designed using a decomposition approach in the sequel. Assumption 3 enables allocation of data for computing separate time slots with different channel realizations to reduce energy consumption.

For a particular channel realization with channel gain h, define $E_{MPT}$ as the amount of energy harvested by the mobile with MPT, and $E_{con}$ as the energy consumed for data computing which is applicable for both local computing and offloading. Then an important definition is given as follows.

Definition 1 (Successful Computing Probability) Successful computing is the event that energy consumption for computing does not exceed the harvested energy under the deadline and energy causality constraints. Then the successful computing probability (SCP), denoted as $P_{scp}$, is defined as the occurrence probability of successful computing when the channel gain h follows the Rician fading distribution, given by equation 3, $$P_{scp} = \mathbb{E}_h[I(E_{MPT} \ge E_{con})] \qquad \text{[Equation 3]}$$

where $\mathbb{E}_h$ denotes the expectation w.r.t channel gain h and the indicator function $I(\varepsilon)$ gives 1 when event $\varepsilon$ occurs and 0 otherwise.

Due to the independency and identicality among events $\{\varepsilon_h\}$ of different channel realizations, maximizing $P_{scp}$ is equivalent to maximize $I(E_{MPT} \ge E_{con})$ for a particular channel gain h. Due to the binary property of the indicator function, it leads to finding the control policy such that the energy savings, denoted as S, given by $S=E_{MPT}-E_{con}$, is positive with high probability. Provided the existence of such policy, then it can be derived from the solution for mobile energy savings maximization problem in the given channel realization. Specially, for local computing where MPT can be performed simultaneously, $E_{MPT}$ is fixed during time interval T such that maximizing S is equivalent to minimize $E_{con}$.

Energy Efficient Mobile Cloud Computing with Static Channels

Consider static channels in this section. For both local computing and offloading, optimization problems are formulated to maximize the mobile energy savings given a channel realization. The main results give the condition of BS transmission power and channel gain for successful computing, which results in the formulation of the SCP for the Rician distributed channels. Moreover, the optimal CPU-cycle frequencies and time division control policies are derived for successful local computing and offloading, respectively.

The UE receives signal from BS and saves energy that is delivered via the signal. The UE determines whether a local computing is feasible and/or whether an offloading is feasible. Then the UE performs one of the local computing or the offloading according to the determination, as specified in followings.

Local Computing with Static Channels

UE determines the local computing is feasible when following equation is met:

$a \le P_b h$ wherein h is the channel gain, $P_b$ is BS transmission power and $$a = \frac{\gamma N^3}{\upsilon T^3},$$

N is upper bounds the number of CPU cycles, $\gamma$ is a constant determined by the switched capacitance, u represents the energy conversion efficiency, B is a channel bandwidth, T is time duration for receiving the signal and offloading.

Considering local computing, the CPU-cycle frequencies are optimized for minimizing the average mobile energy consumption. This is formulated as an optimization problem under a deadline constraint as well as energy causality constraints due to MPT. This non-convex problem is solved via convex relaxation without compromising the solution optimality as proved in the sequel. The SCP is derived based on the condition of channel gain for successful computing.

Let $\bar{E}_{loc}$ denote the average energy consumption for local computing, given as equation 4, $$\hat{E}_{loc} = \Sigma_{k=1}^{N} p_k E(f_k) = \Sigma_{k=1}^{N} \gamma p_k f_k^2 \qquad \text{[Equation 4]}$$

where E(f) is the energy consumption for a single CPU cycle with the frequency f as discussed earlier. The minimization problem has to satisfy the deadline constraint $$\sum_{k=1}^{N} \frac{1}{f_k} \le T$$

and the following set of energy causality constraints:

$$\sum_{k=1}^{m} \gamma f_k^2 \le \upsilon P_b h \sum_{k=1}^{m} \frac{1}{f_k}, m = 1, 2, \ldots, N.$$

As mentioned, the energy causality constraints ensure that the accumulative energy consumption by the end of every CPU cycle does not exceed the amount of energy harvested in the same duration [12]. Based on the above discussion, an optimization problem is formulated as follows:

$$\min_{\{f_k\}} \sum_{k=1}^{N} \gamma p_k f_k^2 \qquad (P1)$$

$$\text{s.t.} \quad \sum_{k=1}^{m} \gamma f_k^2 \le \upsilon P_b h \sum_{k=1}^{m} \frac{1}{f_k}, \quad m = 1, 2, \ldots, N,$$

$$\sum_{k=1}^{N} \frac{1}{f_k} \le T,$$

$$f_k > 0, \qquad k = 1, 2, \ldots, N.$$

It can be observed that the set of energy causality constraints in Problem P1 are non-convex, resulting in a non-convex optimization problem. To address this issue, first, define a set of new variables $\{y_k\}$ as $$y_k = \frac{1}{f_k}$$

for all k. Substituting them into Problem P1 gives $$\min_{\{f_k, y_k\}} \sum_{k=1}^{N} \gamma p_k f_k^2 \qquad (P2)$$

$$\text{s.t.} \quad \sum_{k=1}^{m} \gamma f_k^2 \le \upsilon P_b h \sum_{k=1}^{m} y_k, \quad m = 1, 2, \ldots, N,$$

$$\sum_{k=1}^{N} y_k \le T,$$

$$f_k > 0, y_k f_k = 1, \qquad k = 1, 2, \ldots, N.$$

that, however, remains non-convex. Next, given $f_k > 0$, relaxing the equality constraints in Problem P2 leads to:

$$\min_{\{f_k, y_k\}} \sum_{k=1}^{N} \gamma p_k f_k^2 \qquad (P3)$$

$$\text{s.t.} \quad \sum_{k=1}^{m} \gamma f_k^2 \le \upsilon P_b h \sum_{k=1}^{m} y_k, \quad m = 1, 2, \ldots, N,$$

$$\sum_{k=1}^{N} y_k \le T,$$

$$f_k > 0, \frac{1}{f_k} - y_k \le 0, \quad k = 1, 2, \ldots, N.$$

It can be observed that Problem P3 is a convex optimization problem. Nevertheless, the above relaxation has no effect on the solution optimality as shown in the following lemma.

Lemma 1 The solution for Problem P3 also solves P2. (Proof. See Appendix 6.1)

Lemma 1 is essential for solving the non-convex Problem P2 by equating it with the convex Problem P3 that yields the same solution but admits powerful convex optimization algorithms.

The remainder of this subsection focuses on characterizing the structure of the optimal CPU-cycle frequencies. To this end, several useful properties of the solution for Problem P3 are given as follows.

Lemma 2 The solution for Problem P3, denoted as $\{y_k^*, f_k^*\}$, satisfies the following.

1. The deadline constraint is active:

$$\sum_{k=1}^{N} y_k^* = \sum_{k=1}^{N} \frac{1}{f_k^*} = T. \qquad \text{[Equation 5]}$$

2. The optimal CPU-cycle frequencies can be written as $$f_k^* = \left[ \frac{\mu - \left(\sum_{m=k}^{N} \lambda_m\right) v P_b h}{2\gamma\left(p_k + \sum_{m=k}^{N} \lambda_m\right)} \right]^{\frac{1}{3}}, \forall k, \qquad \text{[Equation 6]}$$

where the nonnegative variables $\mu$, $\{\lambda_m\}$ are the Lagrange multipliers associated with the deadline, and energy causality constraints, respectively.

3. Furthermore, $f_1^* \leq f_2^* \ldots \leq f_N^*$.

Proof See Appendix 6.2.

Another important property is stated in the following lemma.

Lemma 3 The solution for Problem P3 also solves the following Problem P4 that results from removing the first (N−1) energy causality constraints of P3:

$$\min_{\{f_k, y_k\}} \sum_{k=1}^{N} \gamma p_k f_k^2 \qquad (P4)$$

$$\text{s.t.} \quad \sum_{k=1}^{N} \gamma f_k^2 \leq v P_b h \sum_{k=1}^{N} y_k,$$

$$\sum_{k=1}^{N} y_k \leq T,$$

$$f_k > 0, \frac{1}{f_k} - y_k \leq 0, \quad k = 1, 2, \ldots, N.$$

Proof. See Appendix 6.3.

Combining Property 2) in Lemma 2 and Lemma 3 simplifies the expression for the optimal CPU-cycle frequencies as equation 7, $$f_k^* = \left[ \frac{\mu - v P_b h \lambda}{2\gamma(p_k + \lambda)} \right]^{\frac{1}{3}}, \forall k \qquad \text{[Equation 7]}$$

where $\lambda_N$ is re-denoted as $\lambda$ for ease of notation. To obtain the closed form expressions for $\{f_k^*\}$, define two positive constants a and a' as $$a = \frac{\gamma N^3}{v T^3} \text{ and } a' = \frac{\gamma}{v T^3} \left(\sum_{k=1}^{N} p_k^{\frac{1}{3}}\right)^2 \left(\sum_{k=1}^{N} p_k^{-\frac{2}{3}}\right).$$

Then the main result of this subsection is stated as follows.

Theorem 1 (Optimal CPU-cycle frequencies for local computing). The optimal CPU-cycle frequencies $\{f_1^*, f_2^*, \ldots, f_N^*\}$ that solve the optimization problem P4 satisfy the following.

1. If $P_b h < a$, $\{f_1^*, f_2^*, \ldots, f_N^*\}$ is an empty set since Problem P4 is infeasible.

2. If $a \leq P_b h < a'$, $$f_k^* = \left[\frac{1}{T}\sum_{m=1}^{N}(p_m + \lambda)^{\frac{1}{3}}\right](p_k + \lambda)^{-\frac{1}{3}}, \forall k$$

where the positive constant $\lambda$ solves $$\sum_{k=1}^{N} \gamma(f_k^*)^2 = v P_b h \sum_{k=1}^{N} \frac{1}{f_k^*}.$$

3. If $P_b h \geq a'$, $\{f_k^*\}$ are independent of $P_b h$, $$f_k^* = \left(\frac{1}{T}\sum_{m=1}^{N} p_m^{\frac{1}{3}}\right) p_k^{-\frac{1}{3}}, \forall k.$$

Proof. See Appendix 6.4.

a Note that $P_b h$ can represent the received BS transmission power in the channel with channel gain h. The first case ($P_b h < a$) corresponds to the scenario where the received BS transmission power is so low that it is impossible to complete the local computing within the deadline T. In the second case ($a \leq P_b h < a'$), the received BS transmission power is not large but sufficient for meeting the deadline and consequently the optimal CPU-cycle frequencies are functions of $P_b h$. The received BS transmission power is large in the last case ($P_b h \geq a'$) where increasing $P_b$ no longer has any effect on the optimal CPU-cycle frequencies and only increases the amount of energy savings. In this casefd, the optimal CPU-cycle frequencies depend only on the distribution of the number of CPU cycles and the deadline.

Remark 1 Given the channel gain h, there exists a tradeoff between the deadline T and BS transmission power $P_b$. Specifically, meeting a more strict computation deadline requires larger $P_b$ and vice versa.

Remark 2 (BS transmission power and the parameter A) Recall that A is the Lagrange multiplier for solving Problem P4. The optimal CPU-cycle frequencies in Cases 2) and 3) of Theorem 1 correspond to $\lambda > 0$ and $\lambda = 0$, respectively. The case of $\lambda = 0$ (or equivalently $P_b h \geq a'$) implies that the energy causality constraint in Problem P4 is inactive at the solution point, reducing the problem and solution to be identical to those in [28] that considers the local computing without MPT.

Next, the minimum average energy consumption and the corresponding maximum average mobile energy savings are characterized in Corollary 1 that follows from Theorem 1.

Corollary 1 (Energy consumption and energy savings) Assume that the local computing under the constraints of deadline and energy causality is feasible. The minimum average energy consumption for the local computing, denoted as $\overline{E}_{loc}^*$, is given as follows:

1. If $a \leq P_b h < a'$, $\bar{E}_{loc}^*$, is equation 8.

$$\bar{E}_{loc}^* = \frac{\gamma}{T^2}\left[\sum_{k=1}^{N}(p_k+\lambda)^{\frac{1}{3}}\right]^2\left[\sum_{k=1}^{N}p_k(p_k+\lambda)^{\frac{-2}{3}}\right] \quad [\text{Equation 8}]$$

and $\bar{E}_{loc}^*$ is a monotone-decreasing function of $P_b$ satisfying equation 9.

$$\frac{\gamma}{T^2}\left(\sum_{k=1}^{N}p_k^{\frac{1}{3}}\right)^3 < \bar{E}_{loc}^* \leq \frac{\gamma N^2}{T^2}\sum_{k=1}^{N}p_k. \quad [\text{Equation 9}]$$

2. If $P_b h \geq a'$, $\bar{E}_{loc}^*$, is equation 10.

$$\bar{E}_{loc}^* = \frac{\gamma}{T^2}\left(\sum_{k=1}^{N}p_k^{\frac{1}{3}}\right)^3 \quad [\text{Equation 10}]$$

that is independent of $P_b$.

Moreover, the corresponding maximum average mobile energy savings, denoted as $\bar{S}_{loc}^*$, is given as $\bar{S}_{loc}^* = \upsilon P_b hT - \bar{E}_{loc}^*$.

Proof. See Appendix 6.5.

Remark 3 (Minimum average energy consumption vs. BS transmission power) Given the channel gain h, the scenario that the minimum average energy consumption $\bar{E}_{loc}^*$ reduces with increasing BS transmission power $P_b$ in Case 1) of Corollary 1 is due to the energy causality constraint in Problem P4 introduced by MPT Specifically, such a constraint is more strict for smaller $P_b$ and vice versa, resulting in the said property. However, when $P_b$ is sufficiently large ($P_b h \geq a'$), the constraint become inactive and the minimum average energy consumption is a constant independent of $P_b$ as shown in the corollary.

Remark 4 (Nonzero maximum average energy savings) The corollary shows that the maximum average energy savings $\bar{S}_{loc}^*$ reduces with the decreasing of $P_b$, provided that Problem P4 is feasible. Therefore, when $P_b = a$, the mobile obtains the minimum $\bar{S}_{loc}^*$. The reason is that the energy is overly provided by the mobile for all CPU cycle realizations to satisfy the energy causality constraints, such that the average energy savings is nonzero.

Last, given fixed BS transmission power, Theorem 1 gives the sufficient condition for successful local computing: when the instantaneous channel gain satisfies $$h \geq \frac{a}{P_b},$$

then all CPU cycle realizations can be successfully performed. Therefore, the SCP of current case with the Rician distributed fading channel can be bounded in the following Corollary.

Corollary 2 Consider a effective SISO Rician channel. For each channel realization, the local computing with static channels is performed with the optimal CPU-cycle frequencies described in Theorem 1. Then the successful computing probability can be bounded from below as equation 11.

$$P_{scp}^{loc} \geq \int_{\frac{a}{P_b}}^{\infty} f_h(x)dx \quad [\text{Equation 11}]$$

with $f_h(x)$ being the probability density function of h, given as equation 12

$$f_h(x) = \left(\frac{N_t+K}{N_t\Omega}\right)^{\frac{N_t+1}{2}}\left(\frac{x}{K}\right)^{\frac{N_t-1}{2}} \quad [\text{Equation 12}]$$

$$\exp\left(-\frac{(N_t+K)x}{N_t\Omega}-K\right)I_{N_t-1}\left[\sqrt{\frac{4K(K+N_t)x}{L\Omega}}\right]$$

where $\Omega$ is the average fading power and $I_v(x)$ is the v-th order modified Bessel function.

Energy Efficient Offloading with Static Channels

The preceding subsection focuses on wirelessly powered local computing. In this subsection, the other mobile operation mode is considered where computation is offloaded to the cloud. Given the same deadline, the time division between MPT and mobile transmission to the BS is optimized with the objective of maximizing the mobile energy savings. A closed form expression is derived for the optimal time division.

As shown in FIG. 6(b), for the current operation mode and $t' \in (0,T)$, the time interval $[0,T]$ is divided into two parts, $[0,t']$ and $(t',T]$, corresponding to MPT and offloading, respectively. Let the amount of energy harvested over the interval $[0,t']$ be defined as a function of $t'$: $E_{MPT}(t') = \upsilon P_b ht'$. Next, consider offloading in the interval $(t',T]$. Fixed-rate transmission over this interval is assumed since this is the most energy-efficient data transmission policy under a deadline constraint as proved in [14]. Then the energy consumption for offloading, denoted as $E_{off}(t')$, can be written as $$E_{off}(t') = \left[2^{\frac{L}{B(T-t')}}-1\right]\frac{\sigma^2}{h}(T-t').$$

The energy savings is thus given as $S_{off}(t') = E_{MPT}(t') - E_{off}(t')$. Varying $t'$ changes the harvested energy, offloading energy consumption as well as energy savings. Specifically, as $t'$ increases, $E_{MPT}(t')$ grows linearly with $t'$ but $E_{off}(t')$ monotonically increases as shown in [14]. Therefore, the energy savings $S_{off}(t')$ may not be a monotone function and thus optimization is necessary. To simplify notation, define offloading duration $t = T - t'$ and then $E_{MPT}(t)$ and $E_{off}(t)$ can be rewritten as $E_{MPT}(t) = \upsilon P_b h(T-t)$ and $$E_{off}(t) = \left(2^{\frac{L}{Bt}}-1\right)\frac{\sigma^2}{h}t.$$

Based on the above definitions, the problem for maximizing the mobile energy savings of offloading can be formulated as $$\max_t \quad E_{MPT}(t) - E_{off}(t) \quad (P5)$$
$$\text{s.t.} \quad 0 < t < T.$$

Substituting the expression of $E_{MPT}(t)$ and $E_{off}(t)$ rewrites the objective function as equation 13.

$$E_{MPT}(t) - E_{off}(t) = P_b hT + \left(\frac{\sigma^2}{h} - \upsilon P_b h\right)t - \frac{\sigma^2}{h}t 2^{\frac{L}{Bt}}. \quad \text{[Equation 13]}$$

For ease of notation, define the function $y: R \to R$: $y(h)$ is equation 14.

$$y(h) = \left(\frac{\sigma^2}{Bh}\ln 2\right)\exp\left(W\left(\frac{\upsilon P_b h^2}{\sigma^2 e} - \frac{1}{e}\right) + 1\right) \quad \text{[Equation 14]}$$

and the constant is expressed as equation 15.

$$\rho(h) = \frac{\ln 2}{B\left[1 + W\left(\frac{\upsilon P_b h^2}{\sigma^2 e} - \frac{1}{e}\right)\right]}. \quad \text{[Equation 15]}$$

where $W(x)$ is the Lambert function defined as the solution for $W(x)e^{W(x)}=x$. Problem P5 is a convex problem as shown in the following lemma.

Lemma 4 (Convexity of P5) The objective function of Problem P5 is a concave function for $t \in (0, \infty)$ and maximized at $t=\rho(h)L$ with $\rho(h)$ defined in equation 15.

Proof. See Appendix 6.6.

Define a positive and constant a" as equation 16, $$a'' = \frac{\sigma^2}{\upsilon}\left\{1 + \left[\frac{L\ln 2}{BT} + W\left(-e^{-1-\frac{L\ln 2}{BT}}\right)\right] \times \exp\left(\frac{L\ln 2}{BT} + W\left(-e^{-1-\frac{L\ln 2}{BT}}\right) + 1\right)\right\} \quad \text{[Equation 16]}$$

That is, the UE determines the offloading is feasible when following equation is met:

$$P_b h^2 \geq a''$$

wherein h is the channel gain, $P_b$ is BS transmission power and $$a'' = \frac{\sigma^2}{\upsilon}\left\{1 + \left[\frac{L\ln 2}{BT} + W\left(-e^{-1-\frac{L\ln 2}{BT}}\right)\right] \times \exp\left(\frac{L\ln 2}{BT} + W\left(-e^{-1-\frac{L\ln 2}{BT}}\right) + 1\right)\right\},$$

$\sigma^2$ is the variance of complex white Gaussian noise, $\upsilon$ represents the energy conversion efficiency, B is a channel bandwidth, T is time duration for receiving the signal and offloading, L is the number of bits of input data for computation, W is a Lambert function defined as the solution for $W(x)e^{W(x)}=x$.

Then optimizing the objective function of Problem P5 over the interval (0,T) and investigating feasibility conditions yield the solution for the problem as shown in the following theorem.

Theorem 2 The optimal offloading duration t* that solves Problem P5 satisfies the following.

1. If $P_b h^2 < a''$, the problem is infeasible.

2. If $P_b h^2 \geq a''$, $t^* = \rho L$ with $\rho$ defined in equation 15, and the maximum mobile energy savings is $$S_{off}^* = \upsilon P_b hT - y(h)L$$

where $y(h)$ is given in equation 14.

Proof. See Appendix 6.7.

Remark 5 The tradeoff between the deadline T and BS transmission power $P_b$ as discussed in Remark 1 for the local computing also holds for the current operation mode. Moreover, increasing the channel bandwidth B makes it possible to meet a more stringent deadline or allow smaller $P_b$.

Remark 6 (BS transmission power vs. offloading duration) It can be observed from the expression of t* that increasing the BS transmission power $P_b$ reduces the optimal offloading duration t*. The reason is that higher transmission power is affordable leading to a shorter transmission duration given fixed data to be offloaded.

Last, the SCP of current case is given as follows based on Theorem 2.

Corollary 3 Consider a effective SISO Rician channel. For each channel realization, the time division is optimized given in Theorem 2. Then the successful computing probability for the offloading with static channels is equation 17.

$$P_{scp}^{off} = \int_{\sqrt{\frac{a''}{P_b}}}^{\infty} f_h(x)\,dx \quad \text{[Equation 17]}$$

where a" is defined in equation 45 and $f_h(x)$ is given in equation 12.

Determination Between Local Computing and Offloading with Static Channels

Since the mobile has non-causal CSI, for each channel realization, it can decide the operation mode based on whether the successful computing conditions are satisfied and which mode achieves a larger mobile energy savings.

First, if only one operation mode satisfies its successful computing condition $$\left(h \geq \frac{a}{P_b}\right.$$

for local computing and $$h \geq \frac{a''}{P_b}$$

for offloading), then this mode is preferred.

If both the local computing and the offloading are feasible, the UE compares energy saving of the local computing and energy saving of the offloading. Specifically, when both operation modes are successful, compare the amounts of maximum energy savings of the two mobile operation modes. Define the difference between their maximum energy savings as $\Delta S = S_{off}^* - \overline{S}_{loc}^*$. It follows from Theorems 1 and 2 that $$\Delta S = \frac{\gamma\theta}{T^2} - y(h)L \quad \text{[Equation 18]}$$

where the coefficient $\theta$ satisfies $$\left(\sum_{k=1}^{N} p_k^{\frac{1}{3}}\right)^3 \leq \theta \leq N^2 \sum_{k=1}^{N} p_k$$

and y(h) is given in equation 14. Then offloading should be performed if and only if $\Delta S \geq 0$.

From equation 18 and equation 14, the effects of parameters such as the computation deadline T and BS transmission power $P_b$ on the offloading decision are characterized as follows.

1. If $$T \leq \frac{\gamma\theta}{y(h)L},$$

offloading is preferred which implies that a stricter deadline requirement tends to adopt the offloading mode.

2. If $$P_b \leq \frac{\sigma^2}{\upsilon h^2}(1 + ea'''\ln a''')$$

where $$a''' = \frac{Bh\gamma\theta}{eT^2\sigma^2 L\ln 2},$$

offloading is preferred which infers that offloading is preferred when the BS transmission power is insufficient.

The offloading is selected, when one of the above two condition $$\left(T \leq \frac{\gamma\theta}{y(h)L} \text{ or } P_b \leq \frac{\sigma^2}{\upsilon h^2}(1 + ea'''\ln a''')\right)$$

is met.

Energy Efficient Mobile Cloud Computing with Dynamic Channels

While channels are assumed fixed in the preceding section, dynamic channels are considered in this section which are modeled as M channel fading blocks with block duration $T_c$. Optimization problems are formulated as to maximize the total energy savings for a given channel realization, so as to increase SCP for the Rician distributed fading channels. The corresponding control policies have the new feature of data allocation for computing in different channel fading blocks, which are jointly optimized with the control of CPU cycle frequencies and time division.

Energy Efficient Local Computing with Dynamic Channels

Exploiting the different time scales for channel variation and computing in Assumption 2, the problem of optimizing CPU cycle frequencies for local computing can be decomposed into a master and a slave problem. The master problem divides the input data for computing in different fading blocks under the criterion of minimum total energy consumption. Given a particular fading block and allocated data, a slave problem aims at minimizing the energy consumption for computing in the block by controlling CPU cycle frequencies in a similar way as in the preceding section. The detailed problem formulation is described as follows.

Slave problem: Consider a single fading block with channel gain h and allocated data size l. Moreover, let R denote the amount of residual energy from computing in the preceding block. A slave problem for minimizing the computing energy consumption in the block is formulated as (CPU-cycleFrequencies)

$$\min_{\{f_k\}} \sum_{k=1}^{lN_0} \gamma p_k f_k^2 \quad \text{(P6)}$$

$$\text{s.t.} \sum_{k=1}^{m} \gamma f_k^2 \leq \upsilon P_b h \sum_{k=1}^{m} \frac{1}{f_k} + R, \quad m = 1, 2, \ldots, lN_0,$$

$$\sum_{k=1}^{lN_0} \frac{1}{f_k} \leq T_c,$$

$$f_k > 0, \quad k = 1, 2, \ldots, lN_0.$$

Setting R=0 reduces Problem P6 to P2 for the case of static channels. Let $G_{loc}(l,R,h)$ denote the minimum energy consumption for computing l-bit data input in a single fading block. Then $G_{loc}(l,R,h) = \sum_{k=1}^{lN_0} \gamma(p_k f_k^*)^2$ where $\{f_k^*\}$ solve the above slave problem.

Master problem: Let n denote the index of fading blocks. The master problem is formulated as follows.

(DataAllocation)

$$\min_{\{l_n\}} \sum_{n=1}^{M} G_{loc}(l_n, R_n, h_n) \quad \text{(P7)}$$

$$\text{s.t.} \quad G_{loc}(l_n, R_n, h_n) \leq R_n + \upsilon P_b h_n T_c, \quad n = 1, 2, \ldots, M,$$

$$\sum_{n=1}^{M} l_n = L,$$

$$l_n \geq 0, \quad n = 1, 2, \ldots, M.$$

CPU-Cycle Control Policy

The policy resulting from solving Problem P6 can be modified from that obtained from solving P1 for the case of static channels. To this end, define two constants in equation 19:

$$b = \left(\frac{\upsilon P_b h T_c^3 + RT_c^2}{\gamma\theta_0}\right)^{\frac{1}{3}}, \quad b' = \left(\frac{\upsilon P_b h T_c^3 + RT_c^2}{\gamma\theta_1}\right)^{\frac{1}{3}} \quad \text{[Equation 19]}$$

and two functions $$\bar{E}_0(l) = \frac{\gamma\varphi_0 l^3}{T_c^2}, \quad \bar{E}_1(l) = \frac{\gamma\varphi_1 l^3}{T_c^2} \quad \text{[Equation 20]}$$

where l is the input data size and $\theta_0$, $\theta_1$, $\varphi_0$ and $\varphi_1$ are the constants with $\theta_0 > \theta_1$ and $\varphi_0 < \varphi_1$. Following the same procedure as for deriving Theorem 1, the optimal policy for the current case is obtained as follows.

Corollary 4 Consider an arbitrary channel fading block with the corresponding input-data size l and residual energy R. The optimal CPU-cycle frequencies $\{f_k^*\}$ and the minimum energy consumption $G_{loc}(l,R,h)$ are described as follows.

1. If $l \le b$, $$f_k^* = \left(\frac{1}{T_c} \sum_{m=1}^{lN_0} p_m^{\frac{1}{3}}\right) p_k^{-\frac{1}{3}}, \quad \forall k, \text{ and } G_{loc}(l, R, h) = \overline{E}_0(l).$$

2. If $b < l \le b'$, $$f_k^* = \left[\frac{1}{T_c} \sum_{m=1}^{lN_0} (p_m + \lambda)^{\frac{1}{3}}\right] (p_k + \lambda)^{-\frac{1}{3}}, \quad \forall k$$

where the positive constant $\lambda$ solves $$\sum_{k=1}^{lN_0} \gamma(f_k^*)^2 = \upsilon P_b h \sum_{k=1}^{lN_0} \frac{1}{f_k^*} + R.$$

and $$\overline{E}_0(l) < G_{loc}(l, R, h) \le \overline{E}_1(l).$$

Moreover, when $l \to b$, $G_{loc}(l,R,h) \to \overline{E}_0(l)$ and when $l \to b'$, $G_{loc}(l,R,h) \to \overline{E}_1(l)$.

3. If $l > b'$, $\{f_1^*, f_2^*, \ldots, f_{lN_0}^*\}$ is an empty set.

Proof See Appendix 6.8.

This Corollary shows that the slave problem is feasible only if $l \le b'$ where $b'$ is determined by the channel gain h and the residual energy R. Moreover, when $l \le b$, the CPU-cycle frequencies and energy consumption are independent of h, which implies that the energy causality constraints are inactive for small data-input size. However, for the case of $b < l \le b'$, both $\{f_k^*\}$ and $G_{loc}(l,R,h)$ are determined by h, which is consistent with Remark 3.

Sub-Optimal Data Allocation Policy

The derivation of the optimal data allocation policy is intractable due to the lack of a closed form expression for the energy-consumption function, $G_{loc}(l,R,h)$, which can be observed from the solution for the slave problem. In this section, a sub-optimal but simple policy is derived by approximation of $G_{loc}(l,R,h)$ and the amounts of residual energy for the n-th fading block, denoted as $\{R_n\}$.

First, the proposed sub-optimal data allocation policy requires only the following properties of $G_{loc}(l,R,h)$.

Assumption 4 For an arbitrary block fading channel with data-input size l, $G_{loc}(l,R,h)$ is a monotone-increasing, differentiable and convex function in the interval $l \in [0,b']$.

The assumption can be justified as follows. First, the monotonicity of $G_{loc}(l,R,h)$ arises from the fact that computing more data requires additional energy. Next, finite computing energy per bit gives the rationality for the differentiability property. Last, the second derivative of $G_{loc}(l,R,h)$ relates to the increase in energy consumption per additional data bit. For the special case of equal CPU cycle frequencies, the energy consumption of $$\frac{\gamma N_0^3 l^2}{T_c^2}$$

per bit grows with data-input size l, supporting the assumption on the convexity of $G_{loc}(l,R,h)$.

Next, the residual energy variables $\{R_n\}$ are approximated. To this end, $R_n$ can be bounded as follows.

Lemma 5 Given that local computing of input data is feasible, $R_0 = 0$ and $$\frac{\varphi_1}{\theta_1}(\upsilon P_b h_{n-1} T_c + R_{n-1}) \le R_n \le \upsilon P_b h_{n-1} T_c + R_{n-1}$$

for $n = 1, 2, \ldots, M$.

Proof. See Appendix 6.9.

Note that the lower bound on $R_n$ is nonzero due to the energy causality constraint (see Remark 4). Since it is difficult to obtain $R_n$ in closed-form for the same reason as for deriving $G_{loc}(l,R,h)$, $R_n$ is replaced by its lower bound in the design of the proposed data-allocation policy and the result is represented by $\hat{R}_n$. In other words, $$\hat{R}_n = \frac{\varphi_1}{\theta_1}(\upsilon P_b h_{n-1} T_c + \hat{R}_{n-1})$$

$n > 1$ and $\hat{R}_0 = 0$. Correspondingly, the constants b and b' defined in equation 19 are modified as $$\hat{b} = \left(\frac{\upsilon P_b h_n T_c^3 + \hat{R}_n T_c^2}{\gamma \theta_0}\right)^{\frac{1}{3}}, \quad \hat{b}' = \left(\frac{\upsilon P_b h_n T_c^3 + \hat{R}_n T_c^2}{\gamma \theta_1}\right)^{\frac{1}{3}}.$$

Using the approximation and definitions, the average minimum energy consumption for the n-th fading block, denoted as $\hat{G}_{loc}(l_n, \hat{R}_n, h_a)$, follows from Corollary 4 and Assumption 5 as $$\hat{G}_{loc}(l_n, \hat{R}_n, h_n) = \begin{cases} \frac{\gamma \varphi_0 l_n^3}{T_c^2}, & \text{if } l_n \le \hat{b} \\ g(l_n), & \text{if } \hat{b} < l_n \le \hat{b}', \end{cases}$$

where $g(l_n)$ is a general function such that $\hat{G}_{loc}(l_n, \hat{R}_n, h_n)$ has the properties in Assumption 4.

Based on the above approximations, the data-allocation problem for minimizing the total energy consumption can be readily reformulated in a simple form as follows.

(Sub-optimalDataAllocation)          (P8)

$$\{l_n\} \min \sum_{n=1}^{M} \hat{G}_{loc}(l_n, \hat{R}_n, h_n)$$

$$\text{s.t.} \quad \sum_{n=1}^{M} l_n = L,$$

$$0 \le l_n \le \hat{b}', \quad n = 1, 2, \ldots, M.$$

Problem P8 is a convex optimization problem. The structure of the resultant data allocation policy can be characterized as follows. Let $b_n(\xi)$ denote the root of equation:

$$\frac{\partial \hat{G}_{loc}}{\partial l_n}(b_n, \hat{R}_n, h_n) = \xi$$

where $\xi$ is a Lagrange multiplier. Then the main result of this subsection is obtained as shown below.

Proposition 1 If $\Sigma_{n=1}^{M} \hat{b}' \geq L$, Problem P8 is feasible. And the data-allocation policy that solves Problem P8 is given as $$l_n^* = \begin{cases} \hat{b}', & h_n \leq \frac{\gamma \theta_1 b_n^3(\xi) - \hat{R}_n T_c^2}{\upsilon P_b T_c^3} \\ b_n(\xi), & h_n > \frac{\gamma \theta_1 b_n^3(\xi) - \hat{R}_n T_c^2}{\upsilon P_b T_c^3}, \end{cases}$$

where $\xi$ satisfies: $b_n(\xi) > 0$ and $\Sigma_{n=1}^{M} l_n^* = \Sigma_{n=1}^{M} \min\{b_n(\xi), \hat{b}'\} = L$.

Proof. See Appendix 6.10.

Note that the data allocation $\{l_n^*\}$ are nonzero indicating that the policy is utilizing all the fading blocks since the local computing and MPT can be performed simultaneously over these fading blocks.

Remark 7 (CSI) Consider the mobile can only obtain the causal CSI, that is, $\{h_n\}$ are known at the beginning of each fading block and follow a distribution independently and identically. The master-and-slave model is still applicable for the mobile energy savings maximization problem of local computing. However, the master problem for suboptimal data allocation should be modified as a stochastic finite-horizon DP where the cost function is written as the expectation of the energy consumption $\hat{G}_{loc}(l_n, \hat{R}_n, h_n)$ w.r.t $h_n$. Due to the curse of dimensionality of the dynamic DP and few insights of the optimal policy with the causal CSI, the analysis of its performance is omitted in this paper.

Energy Efficient Offloading with Dynamic Channels

Following the local computing counterpart, the problem of optimal computation offloading is formulated using the master-and-slave model. The master problem concerns the optimal data allocation for offloading in different fading blocks with the objective of maximizing the total energy savings. Then given fixed allocated data, residual energy and channel gain, the slave problem aims at finding the optimal time division of a fading block for separate energy harvesting and offloading. The detailed formulation is described as follows.

Slave problem: Consider a single fading block with channel gain h, allocated data-input size l and the residual energy R which comes from offloading in the preceding block. The slave problem is formulated as follows for maximizing the energy savings in the block with the optimal time division.

(TimeDivision) (P9)

$$\max_t \quad E_{MPT}(t, h) - E_{off}(t, h)$$
$$\text{s.t.} \quad 0 < t < T_c,$$
$$R + E_{MPT}(t) - E_{off}(t) \geq 0,$$

where $E_{MPT}(t,h) = \upsilon P_b h(T_c - t)$ and $$E_{off}(t, h) = \left(2^{\frac{L}{Bt}} - 1\right)\frac{\sigma^2}{h}t.$$

Note that setting R=0 reduces Problem P9 to P5. Let $G_{off}(l,R,h)$ denote the maximum energy savings for offloading the l-bit data in this single fading block. Then $G_{off}(l,R,h) = E_{MPT}(t^*,h) - E_{off}(t^*,h)$ where $t^*$ solves the above slave problem.

Master problem: Let n denote the index of fading blocks. Given the solution for the slave problem, the master problem of optimal data allocation over different fading blocks is formulated as follows.

(DataAllocation) (P10)

$$\max_{\{l_n\}} \sum_{n=1}^{M} G_{off}(l_n, R_n, h_n)$$

$$\text{s.t.} \quad R_n = \sum_{m=1}^{n-1} G_{off}(l_m, R_m, h_m), \quad n = 2, \ldots, M,$$

$$R_n \geq 0, \qquad n = 2, \ldots, M,$$

$$R_1 = 0,$$

$$\sum_{n=1}^{M} l_n = L,$$

$$l_n \geq 0, \qquad n = 1, 2, \ldots, M.$$

Optimal Time Division Policy

The slave problem, Problem P10, can be modified from the static-channel counterpart, Problem P5, by adding residual energy and thus solved following a similar procedure. For this purpose, define the following constants in equation 25:

[Equation 25]

$$c = \frac{T_c B\left[1 + W\left(\frac{\upsilon P_b h^2}{\sigma^2 e} \frac{1}{e}\right)\right]}{\ln 2}$$

$$c' = BT_c \log\left(1 + \frac{Rh}{\sigma^2 T_c}\right).$$

Then the optimal time-division policy for the current case with residual energy R is obtained as shown in Corollary 5 following a similar procedure as for deriving Theorem 2.

Corollary 5 Consider an arbitrary channel fading block with l-bit data input and residual energy R. The optimal time division $t^*$ and the maximum energy savings $G_{off}(l,R,h)$ in this block are given as follows.

1. If either: a)

$$R \leq \frac{BT_c y(h)}{\ln 2} \text{ and } l \leq \frac{\upsilon P_b h T_c + R}{y(h)}$$

or b)

$$R > \frac{BT_c y(h)}{\ln 2}$$

and $1 \leq c$, $$t^* = \rho l \text{ and } G_{off}(l,R,h) = \upsilon P_b h T_c - y(h)l.$$

where the constants y(h) and ρ are defined in equation 14 and equation 15, respectively.

2. If $$R > \frac{BT_c y(h)}{\ln 2}$$

and $c < l \leq c'$ $$t^* = T_c \text{ and}$$

$$G_{off}(l, R, h) = -\left(2^{\frac{l}{BT_c}} - 1\right)\frac{\sigma^2}{h}T_c.$$

3. For other combinations of conditions for R and l, Problem P9 is infeasible. Proof. See Appendix 6.11

In the above Corollary, the results of case 1) is the same as that of Problem 5 for the static channels. Although the offloading and MPT are non-overlapping, the expression of $G_{off}(l,R,h)$ in this case indicates that the derivation of maximum energy saving can be deemed as coming from harvesting energy $\upsilon P_b h T_C$ and consuming data transmission energy y(h)l, where y(h) acts like the transmission cost for 1-bit data and decreases with growing channel gain h. Moreover, the results of case 2) implies that the optimal time-division policy for large data-input size (l>c) is offloading during the whole interval supported by a relatively large residual energy $$\left(R > \frac{BT_c y(h)}{\ln 2}\right),$$

and the largest feasible input-data size c' is determined by the residual energy R.

Sub-Optimal Data Allocation Policy

One can observe from the primary problem P10 that different summation terms in the objective function are coupled due to residual energy passed forward from one block to the next. The conventional approach for solving this type of optimization problem is to use DP, which, however, has two main drawbacks in the current case. First, the state space for the resultant DP is continuous and has to be discretized to facilitate iterative computation of the optimal policy. Simulation reveals that discretization can degrade the DP performance to be worse than the sub-optimal low-complexity policy to be presented shortly. More important, the DP approach yields little insight to the structure of the optimal policy while the said sub-optimal policy allows data allocation to be derived in closed form.

The proposed sub-optimal policy is obtained by setting the residual energy variables as zero: $\{R_n\}=\{0\}$, which is observed from the energy causality constraints in Problem P10 to be their lower bound. Combining the approximation of $\{R_n\}$ with Corollary 5 reduces Problem P10 as follows.

(Sub-optimalDataAllocation) (P11)

$$\max_{\{l_n\}} \sum_{n=1}^{M} \upsilon P_b h_n T_c - y(h_n)l_n$$

$$\text{s.t.} \sum_{n=1}^{M} l_n = L,$$

$$0 \leq l_n \leq \frac{\upsilon P_b h_n T_c}{y(h_n)}, \quad n = 1, 2, \ldots, M,$$

where the energy causality constraints in Problem P10 are replaced by $$l_n \leq \frac{\upsilon P_b h_n T_c}{y(h_n)}$$

for n=1, 2, . . . , M. Problem P11 is a convex optimization problem and solving it gives the optimal policy in closed form. To state the policy, let the channel gains $\{h_n\}$ be rearranged and re-denoted as $\{\tilde{h}_n\}$ to be such that $\{y(\tilde{h}_n)\}$ are in ascending order: $y(\tilde{h}_1) \leq y(\tilde{h}_2) \ldots y(\tilde{h}_M)$. Moreover, let Π represent the permutation matrix with equation 26, $$[\tilde{h}_1, \tilde{h}_2, \ldots, \tilde{h}_M]^T = \Pi[h_1, h_2, \ldots, h_M]^T. \quad \text{[equation 26]}$$

Using these definitions, the optimal policy from solving Problem P11 is given in the following proposition.

Proposition 2 If $$\sum_{n=1}^{M} \frac{\upsilon P_b \tilde{h}_n T_c}{y(\tilde{h}_n)} \geq L,$$

Problem 11 is feasible. And the data-allocation policy that solves Problem P11 is given as equation 27:

$$[l_1^*, l_2^*, \ldots, l_M^*]^T = \Pi^{-1} \times [\tilde{l}_1^*, \tilde{l}_2^*, \ldots, \tilde{l}_M^*]^T \quad \text{[Equation 27]}$$

with $\{\tilde{l}_n^*\}$ given in the following equation 28

$$\tilde{l}_n^* = \begin{cases} \frac{\upsilon P_b \tilde{h}_n T_c}{y(\tilde{h}_n)}, & n = 1, 2, \cdots j \\ L - \sum_{n=1}^{j} \frac{\upsilon P_b \tilde{h}_n T_c}{y(\tilde{h}_n)}, & n = j+1 \\ 0, & \text{otherwise,} \end{cases} \quad \text{[Equation 28]}$$

where j is unique and satisfies equation 29:

$$\sum_{n=1}^{j} \frac{\upsilon P_b \tilde{h}_n T_c}{y(\tilde{h}_n)} < L \leq \sum_{n=1}^{j+1} \frac{\upsilon P_b \tilde{h}_n T_c}{y(\tilde{h}_n)}. \quad \text{[Equation 26]}$$

Proof. See Appendix 6.12.

The above data allocation policy is a greedy approach which allocates data to the fading blocks sequentially by the ascending order of $y(h_n)$ (or equivalently the descending order of $h_n$) until all the input data has been allocated.

Remark 8 (CSI) Similar to Remark 7, for the case where only the causal CSI is available at the mobile, the suboptimal data-allocation policy should be modified obtained from the solution for a stochastic finite-horizon DP where the cost function are written as the expectation of the energy saving $G_{off}(l_n, R_n, h_n)$ w.r.t $h_n$. Due to the curse of dimensionality of the dynamic DP and few insights of the resultant optimal policy, the analysis of its performance is omitted in this paper.

Simulation and Discussion

In this section, the performance of local computing and offloading with both static and dynamic channels are investigated by simulation, respectively. The number of CPU cycles required per bit is modeled by a Gamma distribution with $\alpha=4$ and $\beta=200$. Parameters $\varepsilon$ and $\gamma$ are set as 0.05 and $10^{-29}$, respectively. In addition, the variance of complex white Gaussian noise $\sigma^2$ is −90 dB, the channel bandwidth B is 1 Mhz and the energy conversion efficiency $\upsilon$ is 1.

Static Channels

In this subsection, one particular channel realization is firstly considered. The mobile has 1000-bit input data in the static channels with channel gain $h=10^{-5}$. The performance of proposed policies for local computing and offloading and the offloading decision are verified in the followings.

Figure 7:
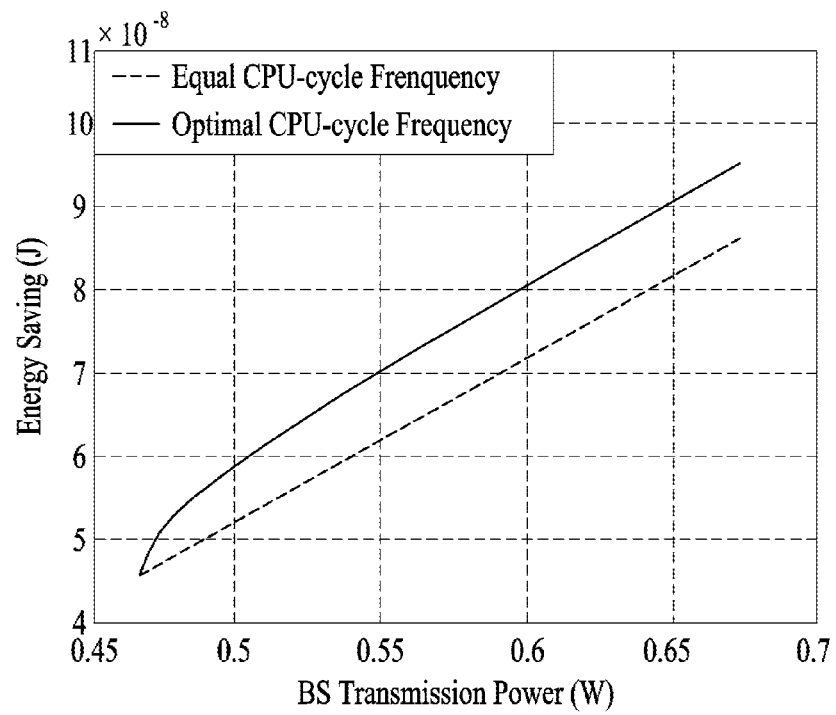
FIG. 7~12 illustrate simulation result.
Figure 8:
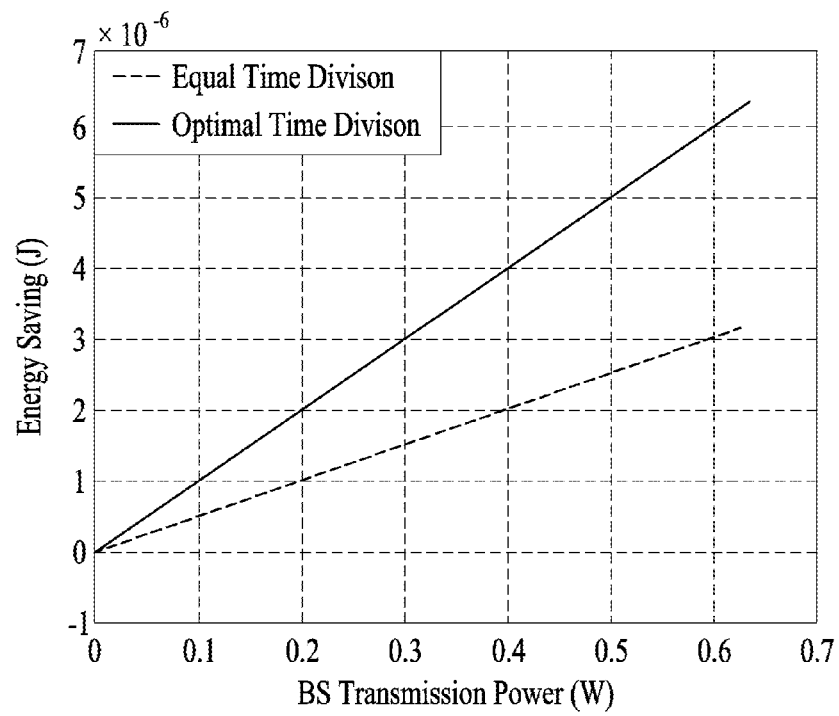

First, FIG. 7 displays the curves of energy savings versus the BS transmission power for local computing. It shows the proposed optimal CPU-cycle frequencies policy can achieve larger energy savings than the baseline policy which deploys the equal CPU-cycle frequency. Similarly, the energy savings gain of proposed policy for offloading is shown in FIG. 8 compared with the equal time division policy, and the gain increases with the growing of BS transmission power.

Figure 9:
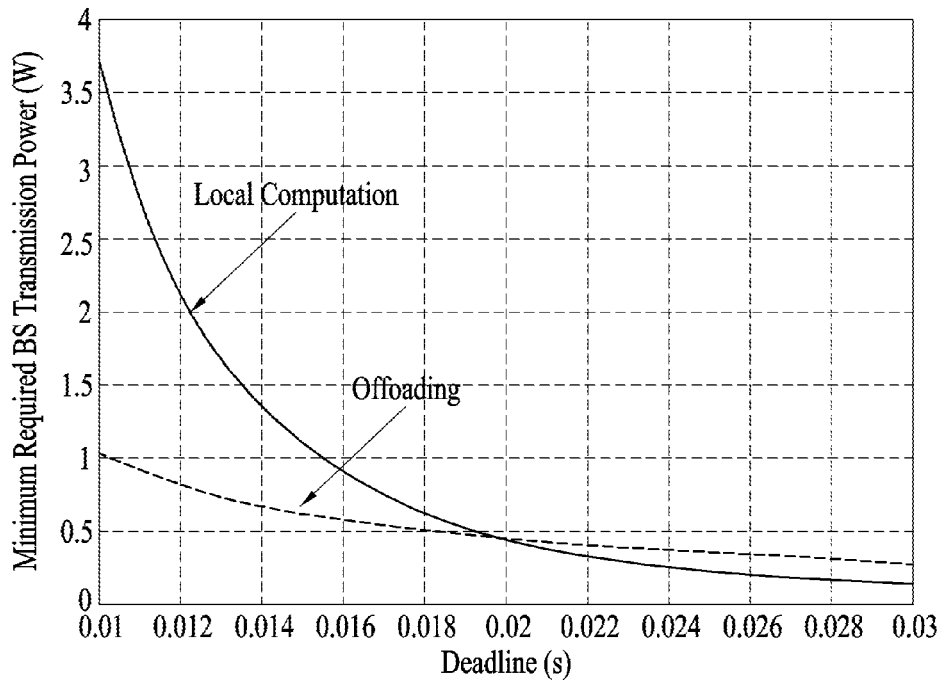

Next, the curves of minimum required BS transmission power versus the deadline for local computing and offloading is depicted in FIG. 9. Several observations are described as follows. First, for both local computing and offloading, the minimum required BS transmission power decreases with the extending of deadline, which indicates extending deadline is a effective method for mobile cloud computing with inefficient BS transmission power. Next, comparing these two curves gives that the minimum required BS transmission power of the two modes are close for T≥0.02 s. Otherwise, the local computing has substantially larger minimum required BS transmission power than offloading, suggesting that offloading is preferred if the BS transmission power is limited and the deadline is strict.

Figure 10:
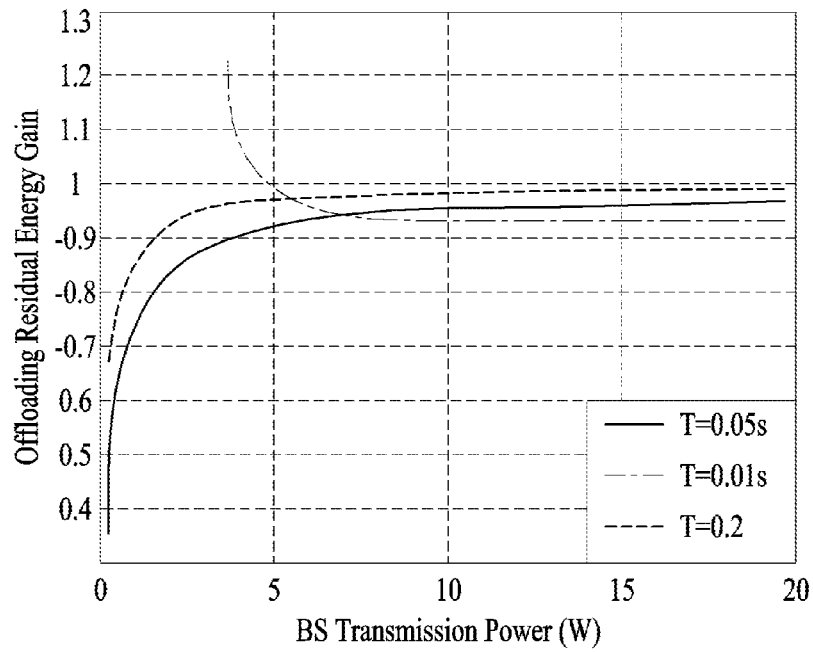

Last, the offloading decision versus the BS transmission power for different deadlines is illustrated in FIG. 10. Define the offloading gain as $G=S_{off}^*/S_{loc}^*$, then the offloading decision is made only when G>1. Comparing these three curves yields that offloading is preferred when the deadline T is relatively stringent. Then, for strict deadline shown in curve of T=0.01 s, insufficient BS transmission power tends to make decision for offloading. Moreover, these two modes achieve comparable energy savings when the BS transmission power is large.

Dynamic Channels

Consider 4 channel fading blocks modeled as follows. The deterministic component $\bar{h}$ is rank-1 with AOA and AOD set as 60°. The average channel power is −50 dB. The duration of each channel is 0.02 s. To verify the advantages of proposed data allocation for local computing and offloading, introduce two baseline policies as follows:

1. Equal data allocation: each fading block is allocated with data $l_n=L/4$.
2. Proportional data allocation: the allocated data-input size is proportional to the channel gain, i.e, $l_n=L(h_n/\Sigma_{n=1}^4 h_n)$ The calculation method of SCP in the simulation is described as follows. For both local computing and offloading, if the proposed adaptive data allocation is infeasible, the mobile will perform a backward step that allocates the extra data input to the last fading block. Moreover, note that the slave problem of local computing optimizes the CPU-cycle frequencies for all possible CPU cycle realization. Then if this problem is infeasible, another backward step will be conducted. The mobile will apply the control policy given in case 3) of Theorem 1, which is proved and verified to be optimal when the harvested energy is enough.

Figure 11:
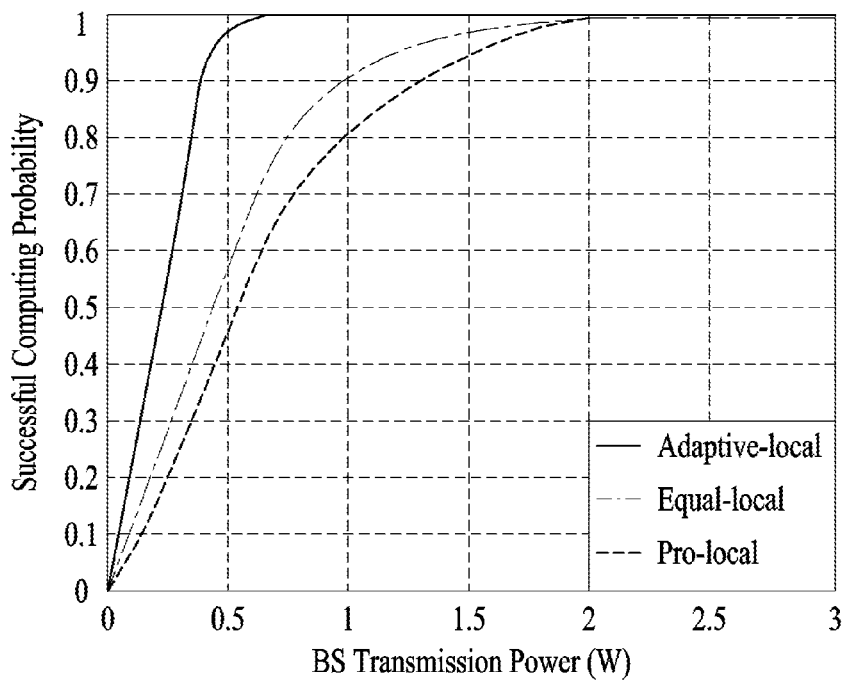

FIG. 11 displays the performances of SCP versus the BS transmission power for local computing with K=0. The observations are described as follows. First, the proposed sub-optimal adaptive data allocation policies have larger SCP than the baseline policies. The SCP gain is larger for insufficient BS transmission power. Next, equal data allocation policy has larger SCP than the proportional one, which indicates balancing computation workload weighted by channel gain is not good. Last, all SCP tends to be 1 when the BS transmission power is large.

Figure 12:
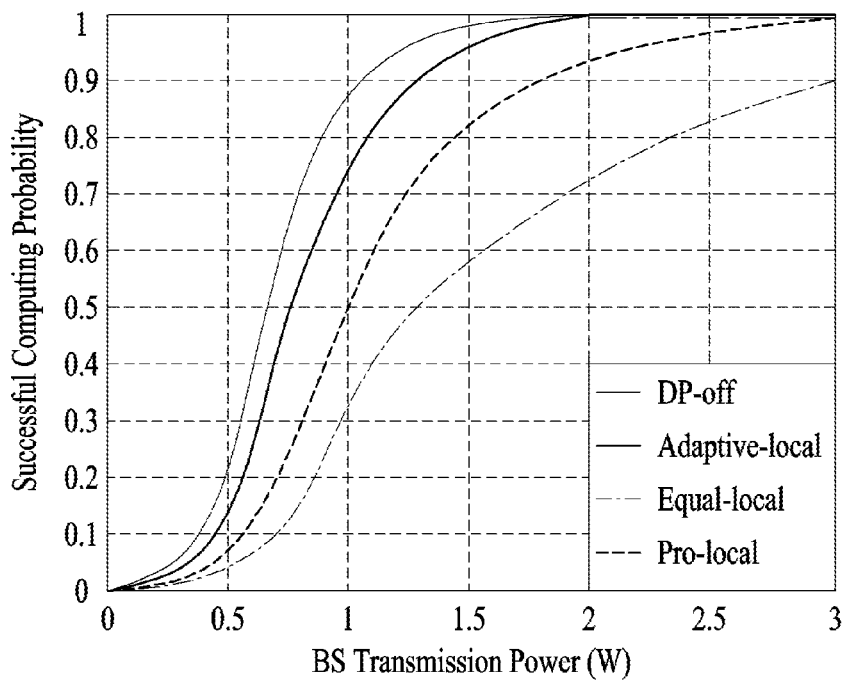

Similar observations can be made in FIG. 12 for SCP of offloading mode. The adaptive has larger SCP than the equal and proportional data allocation policies, but is a little worse than DP-based policy. Different from the conclusion of local computing, the proportional data allocation has better performance of SCP than equal data allocation.

A novel framework of wirelessly powered mobile cloud computing has been proposed in this paper. The mobile has two operation modes: local computing and offloading. For these two modes, the problem of maximization the successful computing probability with Rician distributed fading channel is converted to the mobile energy savings maximization problem for two particular channel realization: static and dynamic channels. The optimal CPU-cycle frequencies for local computing and time division for offloading are derived in static channels. For dynamic channels, the master-and-slave model is deployed for both modes, where the slave problem for single fading block is solved in a similar procedure of static channels and the master problem gives the sub-optimal data allocation with approximation techniques. The performance of proposed policies is evaluated by simulation.

This work can be extended to several interesting directions. First, the mobile is assumed to be equipped with one half-duplex antenna in this paper. Full-duplex antenna or multiple antenna will harvest more energy and increase offloading transmission rate. Therefore, the optimization problem for energy savings should be modified. Second, only one operation mode is conducted during one fading block in this paper. Another case is joint local computing and offloading. The cooperation between these two modes needs further investigation. Third, mobile energy savings is maximized in this system. Other objectives such as computation completion time can be considered. Last, the point-to-point mobile cloud computing system can be developed to the wirelessly powered multi-user mobile cloud computing framework, where the recourse allocation among users should be considered and the BS needs more sophisticated control for the total energy savings in the system.

APPENDIX

The appendix needs to be modified.

6.1 Proof of Lemma 1

Consider Problem P3, first, define a Lagrangian function as $$L = \sum_{k=1}^{N} \gamma p_k f_k^2 + \sum_{m=1}^{N} \lambda_m \left( \sum_{k=1}^{m} \gamma f_k^2 - \upsilon P_b h \sum_{k=1}^{m} y_k \right) + \mu \left( \sum_{k=1}^{N} y_k - T \right) + \sum_{k=1}^{N} \eta_k \left( \frac{1}{f_k} - y_k \right)$$

where the nonnegative variables $\mu$, $\{\lambda_m\}$ and $\eta_k$ are the Lagrange multipliers associated with deadline, energy causality and relaxed inequality constraints, respectively. Next, according to the KKT conditions, it follows that:

$$\frac{\partial L}{\partial f_k^*} = 2\gamma p_k f_k^* + \left( \sum_{m=k}^{N} \lambda_m \right)(2\gamma f_k^*) - \eta_k \frac{1}{(f_k^*)^2} = 0, \forall k, \quad \text{[equation 30]}$$

$$\frac{\partial L}{\partial y_k^*} = \left( \sum_{m=k}^{N} \lambda_m \right)(-\upsilon P_b h) + \mu - \eta_k = 0, \forall k, \quad \text{[equation 31]}$$

$$\lambda_m \left[ \sum_{k=1}^{m} \gamma (f_k^*)^2 - \upsilon P_b h \sum_{k=1}^{m} y_k^* \right] = 0, \forall m, \quad \text{[equation 32]}$$

$$\mu \left( \sum_{k=1}^{N} y_k^* - T \right) = 0, \quad \text{[equation 33]}$$

$$\eta_k \left( \frac{1}{f_k^*} - y_k^* \right) = 0, \forall k, \quad \text{[equation 34]}$$

$$\lambda_k \geq 0, \mu \geq 0, \eta \geq 0, f_k^* > 0, y_k^* > 0, \forall k \quad \text{[equation 35]}$$

Given positive $f_k^*$, it can be derived from (equation 30) that $$(f_k^*)^3 = \frac{\eta_k}{2\gamma \left( p_k + \sum_{m=k}^{N} \lambda_m \right)}, \forall k. \quad \text{[equation 36]}$$

Since $\gamma$ and $p_k$ are positive and $\{\lambda_m\}$ are nonnegative, to guarantee $f_k^*$ to be positive, it gives that: $\eta_k > 0$ for all k. Then combining it with slackness condition (equation 34) leads to $$y_k^* = \frac{1}{f_k^*},$$

which gives the desired result.

6.2 Proof of Lemma 2

With the result of Lemma 1 that $\eta_k > 0$, it follows from (equation 31) that: $\mu = \eta_k + (\Sigma_{m=k}^{N}\lambda_k)(\upsilon P_b h) > 0$. Combining the associated slackness condition (equation 33) gives that $$\sum_{k=1}^{N} y_k^* = \sum_{k=1}^{N} \frac{1}{f_k^*} = T.$$

Then, the optimal CPU-cycle frequencies can be expressed as equation 6. Next, compare $f_k^*$ and $f_{k+1}^*$, where k=1, 2, ... N−1. Since $p_{k+1} < p_k$ and $\Sigma_{m=k+1}^{N+1}\lambda_m \leq \Sigma_{m=k}^{N}\lambda_m$, it follows that $f_{k+1}^* \geq f_k^*$, completing the proof.

6.3 Proof of Lemma 3

It can be proved by contradiction. Assume there exists an integer m where $2 \leq m \leq N-1$ such that $\lambda_m > 0$ and $\lambda_i = 0$ for i=1, 2, ..., m−1. It follows from (equation 32) that $$\sum_{k=1}^{m} \left[ \gamma (f_k^*)^2 - \upsilon P_b h \frac{1}{f_k^*} \right] =$$

$$\sum_{k=1}^{m-1} \left[ \gamma (f_k^*)^2 - \upsilon P_b h \frac{1}{f_k^*} \right] + \left[ \gamma (f_m^*)^2 - \upsilon P_b h \frac{1}{f_m^*} \right] = 0$$

Since the energy causality constraints requires that $$\sum_{k=1}^{m-1} \left[ \gamma (f_k^*)^2 - \upsilon P_b h \frac{1}{f_k^*} \right] \leq 0,$$

it gives that $$\gamma (f_m^*)^2 - \upsilon P_b h \frac{1}{f_m^*} \geq 0.$$

Using the monotonicity in $\{f_k^*\}$ (see Lemma 2), for the m+1-th cycle, it has $$\gamma (f_{m+1}^*)^2 - \upsilon P_b h \frac{1}{f_{m+1}^*} > \gamma (f_m^*)^2 - \upsilon P_b h \frac{1}{f_m^*} \geq 0$$

which results in $$\sum_{k=1}^{m+1} \left[ \gamma (f_k^*)^2 - \upsilon P_b h \frac{1}{f_k^*} \right] =$$

$$\sum_{k=1}^{m} \left[ \gamma (f_k^*)^2 - \upsilon P_b h \frac{1}{f_k^*} \right] + \left[ \gamma (f_{m+1}^*)^2 - \upsilon P_b h \frac{1}{f_{m+1}^*} \right] > 0,$$

contradicting the energy causality constraints. Similar proof by contradiction also applies to the $\lambda_1$. Therefore, the Lagrange multipliers $\{\lambda_m\}$ for Problem P3 satisfy $\lambda_1 = \lambda_2 = ... = \lambda_{N-1} = 0$ and $\lambda_N \geq 0$, yielding the desired result.

6.4 Proof of Theorem 1

Considering Problem P4, the conditions for feasible cases are analyzed as following.

If $\lambda > 0$, the optimal CPU-cycle frequency is (equation 7). Substituting it into the energy causality constraint gives:

[Equation 37]

$$\left(\frac{\mu - \upsilon P_b h\lambda}{2\gamma}\right)^{\frac{2}{3}}\left[\sum_{k=1}^{N}(p_k+\lambda)^{\frac{-2}{3}}\right] = \frac{\upsilon P_b hT}{\gamma}.$$ equation 37

Likewise, the deadline constraint can be expressed as:

[Equation 38]

$$\left(\frac{2\gamma}{\mu - \upsilon P_b h\lambda}\right)^{\frac{1}{3}}\left[\sum_{k=1}^{N}(p_k+\lambda)^{\frac{1}{3}}\right] = T.$$ equation 38

Combining these two constraints results in:

[Equation 39]

$$P_b = \frac{\gamma}{\upsilon hT^3}\left[\sum_{k=1}^{N}(p_k+\lambda)^{\frac{1}{3}}\right]^2\left[\sum_{k=1}^{N}(p_k+\lambda)^{\frac{-2}{3}}\right].$$ equation 39

Then, consider the monotone property of $P_b$. The first derivative of $P_b$ with respect to $\lambda$ is $$\frac{\partial P_b}{\partial \lambda} = \frac{2\gamma}{3\upsilon hT^3}\left[\sum_{k=1}^{N}(p_k+\lambda)^{\frac{1}{3}}\right]\left\{\left[\sum_{k=1}^{N}(p_k+\lambda)^{\frac{-2}{3}}\right]^2 - \left[\sum_{k=1}^{N}(p_k+\lambda)^{\frac{1}{3}}\right]\left[\sum_{k=1}^{N}(p_k+\lambda)^{\frac{-5}{3}}\right]\right\}$$

For notation simplicity, define $$u_k = (p_k+\lambda)^{\frac{1}{3}}, v_k = (p_k+\lambda)^{\frac{-2}{3}}$$

and $w_k = p_k + \lambda$. The first derivative can be expressed as:

$$\frac{\partial P_b}{\partial \lambda} = \frac{2\gamma}{3\upsilon hT^3}\left(\sum_{k=1}^{N} u_k\right)\left\{\left(\sum_{k=1}^{N} v_k\right)^2 - \left(\sum_{k=1}^{N} v_k w_k\right)\left(\sum_{k=1}^{N}\frac{v_k}{w_k}\right)\right\}$$

By Cauchy inequality, it follows that:

$$\left(\sum_{k=1}^{N} v_k w_k\right)\left(\sum_{k=1}^{N}\frac{v_k}{w_k}\right) \overset{(a)}{\geq} \left(\sum_{k=1}^{N} v_k\right)^2$$

The equality in (a) holds only when $$\sqrt{v_k w_k} = \varphi\sqrt{\frac{v_k}{w_k}}$$

for all k, which cannot be satisfied in this problem. Consequently, it leads to that $$\frac{\partial P_b}{\partial \lambda} < 0.$$

Furthermore, the asymptotic properties are derived as following.

1. when $\lambda \to 0$, $$P_b \to \frac{a'}{h}$$

where $$a' = \frac{\gamma}{\upsilon T^3}\left(\sum_{k=1}^{N} p_k^{\frac{1}{3}}\right)^2\left(\sum_{k=1}^{N} p_k^{-\frac{2}{3}}\right).$$

2. when $\lambda \to \infty$, $$P_b \to \frac{a}{h}$$

where $$a = \frac{\gamma N^3}{\upsilon T^3}.$$

Combining them with the monotone-decreasing property of $P_b$ gives that: if $\Delta > 0$, it has $$\frac{a}{h} \leq P_b < \frac{a'}{h}.$$

If $\Delta = 0$, combining equation 7 and equation 38 leads to $$f_k^* = \left(\frac{1}{T}\sum_{m=1}^{N} p_m^{\frac{1}{3}}\right)p_k^{-\frac{1}{3}}.$$

Substituting it into causality constraint gives:

$$P_b \geq \frac{a'}{h}.$$

Therefore, it can be concluded that if $$P_b < \frac{a}{h},$$

problem P3 is infeasible, completing the proof.

6.5 Proof of Corollary 1

First, substituting the optimal CPU-cycle frequencies into the objective function of Problem P4 $\bar{E}_{loc}^*$ and combining it with the deadline constraint equation 38 gives:

$$E_{loc}^* = \sum_{k=1}^{N} \gamma p_k (f_k^*)^2 = \frac{\gamma}{T^2} \left[\sum_{k=1}^{N} (p_k + \lambda)^{\frac{1}{3}}\right]^2 \left[\sum_{k=1}^{N} p_k (p_k + \lambda)^{\frac{-2}{3}}\right].$$ equation 40

Then, consider its monotone property. The first derivative of $\overline{E}_{loc}^*$ with respect to $\lambda$ is:

$$\frac{\partial \overline{E}_{loc}^*}{\partial \lambda} = \frac{2\gamma}{3T^2} \left[\sum_{k=1}^{N}(p_k+\lambda)^{\frac{1}{3}}\right] \left\{\left[\sum_{k=1}^{N}(p_k+\lambda)^{\frac{-2}{3}}\right]\left[\sum_{k=1}^{N}p_k(p_k+\lambda)^{\frac{-2}{3}}\right] - \left[\sum_{k=1}^{N}(p_k+\lambda)^{\frac{1}{3}}\right]\left[\sum_{k=1}^{N}p_k(p_k+\lambda)^{\frac{-5}{3}}\right]\right\}$$

For notation simplicity, define $$a_k = (p_k + \lambda)^{\frac{-1}{3}}.$$

Then $p_k = a_k^{-3} - \lambda$ and the first derivative is rewritten as:

$$\frac{\partial \overline{E}_{loc}^*}{\partial \lambda} = \frac{2\gamma}{3T^2}\left(\sum_{k=1}^{N} a_k^{-1}\right)\left\{\left(\sum_{k=1}^{N} a_k^2\right)\left(\sum_{k=1}^{N}(a_k^{-3}-\lambda)a_k^2\right) - \left(\sum_{k=1}^{N} a_k^{-1}\right)\left(\sum_{k=1}^{N}(a_k^{-3}-\lambda)a_k^5\right)\right\}$$

By algebraic calculation, the part in the brace is $$\sum_{i=1}^{N}\sum_{j=1,j\neq i}^{N}\frac{1}{a_i a_j}[a_i^3 - a_j^3 + \lambda(a_j^6 - a_i^3 a_j^3)] = \sum_{i=1}^{N}\sum_{j=i+1}^{N}\frac{1}{a_i a_j}[\lambda(a_i^3 - a_j^3)^2] \geq 0$$

Therefore, it follows that if $\lambda > 0$, $$\frac{\partial \overline{E}_{loc}^*}{\partial \lambda} > 0;$$

and if $\lambda = 0$, $$\frac{\partial E_{m,c}^*}{\partial \lambda} = 0.$$

Furthermore, for the case of $\lambda > 0$ (equivalently: $a \leq P_b < a'$), it has:

1. if $\lambda \to 0$, $$\overline{E}_{loc}^* \to \frac{\gamma}{T^2}\left(\sum_{k=1}^{N} p_k^{\frac{1}{3}}\right)^3.$$

2. if $\lambda \to \infty$, $$\overline{E}_{loc}^* \to \frac{\gamma N^2}{T^2}\sum_{k=1}^{N} p_k.$$

Combined with the monotone-increasing property of $\overline{E}_{loc}^*$, the minimum energy consumption is derived:

$$\frac{\gamma}{T^2}\left(\sum_{k=1}^{N} p_k^{\frac{1}{3}}\right)^3 < \overline{E}_{loc}^* \leq \frac{\gamma N^2}{T^2}\sum_{k=1}^{N} p_k.$$

For the case of $\lambda = 0$ (equivalently:

$$P_b \geq \frac{a'}{h}\bigg),$$

it follows:

$$\overline{E}_{loc}^* = \frac{\gamma}{T^2}\left(\sum_{k=1}^{N} p_k^{\frac{1}{3}}\right)^3,$$

completing the proof.

6.6 Proof of Lemma 4

For Problem P5, the first derivative of the objective function for $t \in (0, \infty)$ can be derived:

$$\frac{\partial S_{off}}{\partial t} = A + \left(D - \frac{DL\ln2}{Bt}\right)2^{\frac{L}{Bt}}$$

from which the second derivative follows:

$$\frac{\partial^2 S_{off}}{\partial t^2} = \frac{DL^2(\ln2)^2}{B^2 t^3}2^{\frac{L}{Bt}} < 0$$

since $D < 0$, verifying the concavity of $S_{off}$. Then letting the first derivative be equal to leads to:

[Equation 41]

$$\frac{A}{D} = \left(\frac{L\ln2}{Bt} - 1\right)2^{\frac{L}{Bt}}$$ equation 41

Define this turing point as $t_0$, by the algebraic calculation, equation 41 can be expressed as $U = Ye^Y$ where $$U = \frac{A}{De} = \frac{\alpha P_b h^2}{\sigma^2 e} - \frac{1}{e}, \text{ and } Y = \frac{L\ln2}{Bt_0} - 1.$$

Using the Lambert function which is define as the solution for $W(x)e^{W(x)} = x$, it follows that $t_0 = \rho(h)L$, $\rho(h)$ defined in equation 15. Furthermore, it can be observed that if $t \to 0$, $$\frac{\partial S_{off}}{\partial t} \to \infty.$$

Therefore, $S_{off}$ is maximized at $t=\rho(h)L=t_0$, leading to the desired results.

6.7 Proof of Theorem 2

First, if $t_0 \geq T$, it can be proved that $S_{off}^*$ is maximized at $t=T$ and the maximum energy savings is negative, which is infeasible. Therefore, it needs to satisfy $t_0 \in (0,T)$ such that the optimal time division is $t^*=t_0$. Since when $t \to 0$, $$\frac{\partial S_{off}}{\partial t} \to \infty,$$

it only needs to meet that when $t=T$, $$\frac{\partial S_{off}}{\partial t} < 0$$

which follows that $$P_b > P' = \frac{\sigma^2}{\alpha h^2}\left[\left(\frac{L\ln 2}{BT}-1\right)2^{\frac{L}{BT}}+1\right]. \quad \text{[Equation 42]}$$

Next, consider the maximum mobile energy savings $S_{off}^*$. Substituting equation 41 which gives $$A = D\left(\frac{L\ln 2}{Bt^*}-1\right)2^{\frac{L}{Bt^*}}$$

into the objective function of the Problem P6 results in $$\begin{aligned} S_{off}^* &= \upsilon P_b hT - Dt^*\left(\frac{L\ln 2}{Bt^*}-1\right)2^{\frac{L}{Bt^*}} + Dt^* 2^{\frac{L}{Bt^*}} \quad \text{[Equation 43]} \\ &= \upsilon P_b hT - \left(\frac{\sigma^2}{Bh}L\ln 2\right)2^{\frac{L}{Bt^*}} \\ &= \upsilon P_b hT - \left(\frac{\sigma^2}{Bh}L\ln 2\right)\exp\left(W\left(\frac{\upsilon P_b h^2}{\sigma^2 e}-\frac{1}{e}\right)+1\right). \end{aligned}$$

To guarantee the mobile has non-negative maximum energy savings, from equation 43, it results in:

$$\frac{\upsilon P_b h^2}{\sigma^2 e} \geq \frac{L\ln 2}{BT}\exp\left(W\left(\frac{\alpha P_b h^2}{\sigma^2 e}-\frac{1}{e}\right)\right)$$

Using $$U = \frac{\upsilon P_b h^2}{\sigma^2 e}$$

defined in Appendix 6.6 and defining $$V = \frac{L\ln 2}{BT}$$

simplifies the above equation as $$U + \frac{1}{e} \geq Ve^{W(U)} \quad \text{[Equation 44]}$$

Then applying $U=W(U)e^{W(U)}$ gives that $$[W(U)-V]e^{W(U)} \geq -\frac{1}{e}.$$

It can be observed that this inequality equation always holds if $W(U)-V \geq 0$. For the case of $W(U)-V<0$, it can be derived that $[W(U)-V]e^{W(U)-V} \geq -e^{-1-V}$. Applying the Lambert function again and combining these two cases together result in $$U \geq \{V+W(e^{-1-V})\}e^{V+W(e^{-1-V})},$$

from which it follows that $$P_b h^2 \geq a'' = \frac{\sigma^2}{\upsilon}\left\{1+\left[\frac{L\ln 2}{BT}+W\left(-e^{-1-\frac{L\ln 2}{BT}}\right)\right] \times \right. \quad \text{equation 45}$$
$$\left. \exp\left(\frac{L\ln 2}{BT}+W\left(-e^{-1-\frac{L\ln 2}{BT}}\right)+1\right)\right\}.$$

Last, it can be derived that $\max\{P',a''\}=a''$. Therefore, the feasibility condition is $P_b h^2 \geq a''$, completing the proof.

6.8 Proof of Corollary 4

The only difference of the problem formulation between Problem P6 and P1 is the energy causality constraints which has additional residual energy R in Problem P6. The constant R does not change the problem structure greatly such that following the similar procedure for deriving Theorem 1 gives the following optimal CPU cycle control.

$$f_k^* = \left[\frac{\mu - \upsilon P_b h \lambda}{2\gamma(p_k+\lambda)}\right]^{\frac{1}{3}}, \forall k,$$

where $\lambda$ satisfies the deadline and energy causality constraint. Since increasing the data-input size l requires larger $P_b$, referring the proof of Theorem 1, it can be derived that for the feasible cases, 1. If $\lambda=0$, it has $\gamma(lN_0)^3 < \upsilon P_b hT_c^3 + RT_c^2$. Defining $\theta_0=N_0^3$ gives that $$l < b = \left(\frac{\upsilon P_b h T_c^3 + RT_c^2}{\gamma \theta_0}\right)^{\frac{1}{3}}.$$

And the average minimum energy consumption is $$\overline{E}_0(l) = \frac{\gamma}{T_c^2}\left(\sum_{k=1}^{lN_0} p_k^{\frac{1}{3}}\right)^3 = \frac{\gamma}{T_c^2}\left[\sum_{i=0}^{N_0-1}\sum_{j=1}^{l}(p_{li+j})^{\frac{1}{3}}\right]^3 =$$

-continued $$\frac{\gamma}{T_c^2}\left[\sum_{i=0}^{N_0-1}\sum_{j=1}^{l}(q_{i+j})^{\frac{1}{3}}\right]^3 \stackrel{(b)}{=} \frac{\gamma}{T_c^2}\left[l\sum_{i=0}^{N_0-1}(q_{i+\delta_1})^{\frac{1}{3}}\right]^3.$$

where $q_k$ is defined as $q_k=\Pr(X>k)$ and it satisfies $\Pr(X>N_0)<\varepsilon$ as mentioned in system model, and (b) is due to the mean value theorem. Defining $$\varphi_0 = \left[\sum_{i=0}^{N_0-1}(q_{i+\delta_1})^{\frac{1}{3}}\right]^3$$

leads to $$\overline{E}_0(l) = \frac{\gamma\varphi_0 l^3}{T_c^2}.$$

2. If $\lambda>0$, the following two conditions hold:

$$\gamma(lN_0)^3 \geq \upsilon P_b h T_c^3 + RT_c^2 \qquad \text{equation 46}$$

and $$\gamma\left(\sum_{k=1}^{lN_0} p_k^{\frac{1}{3}}\right)^2\left(\sum_{k=1}^{lN_0} p_k^{-\frac{2}{3}}\right) \leq \upsilon P_b h T_c^3 + RT_c^2.$$

The first condition can be expressed as $l \geq b$, and the second condition simplified in the same technique is given as $$\gamma\left[l\sum_{i=0}^{N_0-1}(q_{i+\delta_2})^{\frac{1}{3}}\right]^2\left[l\sum_{i=0}^{N_0-1}(q_{i+\delta_3})^{-\frac{2}{3}}\right] \leq P_b h T_c^3 + RT_c^2.$$

Define $$\theta_1 = \left[\sum_{i=0}^{N_0-1}(q_{i+\delta_2})^{\frac{1}{3}}\right]^2\left[\sum_{i=0}^{N_0-1}(q_{i+\delta_3})^{-\frac{2}{3}}\right].$$

Then the second condition is expressed as $$l \leq b' = \left(\frac{\upsilon P_b h T_c^3 + RT_c^2}{\gamma\theta_1}\right)^{\frac{1}{3}}.$$

The minimum average energy consumption $\overline{E}(l)$ satisfies $\overline{E}_0(l) \leq \overline{E}(l) \leq \overline{E}_1(l)$ where $$\overline{E}_1(l) = \frac{\gamma l^2 N_0^2}{T_c^2}\left(l\sum_{i=0}^{N_0-1} q_{i+\delta_4}\right) = \frac{\gamma\varphi_1 l^3}{T_c^2}$$

with $\varphi_1 = N_0^2(\Sigma_{i=0}^{N_0-1} q_{i+\delta_4})$. Moreover, when $l \to b$, $\overline{E}(l) \to \overline{E}_0(l)$ and when $l \to b'$, $\overline{E}(l) \to \overline{E}_1(l)$, completing the proof.

6.9 Proof of Lemma 5

According to Corollary 4 and Remark 4, for the n-th fading block with residual energy $R_n$, the minimum energy savings of this block happens when $l_n=b_{n'}$. In this case, the residual energy for the next fading block is $$R_{n+1} = R_n + \upsilon P_b h_n T_c - G(b_{n'}) = R_n + \upsilon P_b h_n T_c - \frac{\gamma\varphi_1 b_{n'}^3}{T_c^2} \qquad [\text{Equation 55}]$$

Then substituting $b_{n'}$ gives the desired result 6.10 Proof of Proposition 1

Define the Lagrangian function for this standard convex optimization problem:

$$L = \Sigma_{n=1}^M \hat{G}(l_n, \hat{R}_n, h_n) + \xi(L - \Sigma_{n=1}^M l_n) + \Sigma_{n=1}^M \overline{\omega}_n(-l_n) + \Sigma_{n=1}^M \zeta_n(l_n - \hat{b}'). \qquad [\text{Equation 48}]$$

Applying the KKT condition leads to $$\frac{\partial L}{\partial l_n}(l_n^*) = \hat{G}'(l_n^*, \hat{R}_n, h_n) - \xi - \varpi_n + \zeta_n = 0, \forall n, \qquad [\text{equation 49}]$$

$$\varpi_n l_n^* = 0, \forall n, \qquad [\text{equation 50}]$$

$$\zeta^*(l_n^* - \hat{b}') = 0, \forall n, \qquad [\text{equation 51}]$$

$$\sum_{n=1}^M l_n^* = L, \qquad [\text{equation 52}]$$

$$\varpi_n \geq 0, \zeta_n \geq 0 \forall n \qquad [\text{equation 53}]$$

First, it can be proved that $l_n^*>0$ and $\overline{\omega}_n=0$ for all n by the following steps. 1) Observe that $\hat{G}'(l_n,\hat{R}_n,h_n)\geq 0$ and equals to 0 only when $l_n^*=0$. 2) Suppose there exists a n such that $l_n^*=0$. It leads to $\zeta_n=0$ and $\hat{G}'(l_n^*,\hat{R}_n,h_n)=0$. From (equation 49), it gives $\xi=-\overline{\omega}_n\leq 0$. 3) There always exist one j where $j\neq n$ such that $l_j^*>0$. Therefore, $\overline{\omega}_j=0$ and $\hat{G}'(l_j^*,\hat{R}_j,h_j)>0$. From (equation 49), it can be derived that $\zeta_j=\xi-\hat{G}'(l_j^*,\hat{R}_j,h_j)<0$ which contradicts to the condition $\xi_j\geq 0$ and leads to the given results.

Then, the data allocation follows:
1. If $l_n^*<\hat{b}'$, it has $\zeta_n=0$ and $\hat{G}'(l_n^*,\hat{R}_n,h_n)=\xi$;
2. If $l_n^*=\hat{b}'$, it has $\hat{G}'(l_n^*,\hat{R}_n,h_n)+\zeta_n=\hat{G}'(\hat{b}',\hat{R}_n,h_n)+\zeta_n=\xi$ In conclusion, $l_n^*=\min\{b_n(\xi),\hat{b}'\}$ where $b_n(\xi)$ is the root of function $\hat{G}'(b_n)=\xi$ and $\xi$ satisfies $\Sigma_{n=1}^M l_n^*=L$. Specially, When $$b_n(\xi) \geq \hat{b}' = \left(\frac{\upsilon P_b h_n T_c^3 + \hat{R}_n T_c^2}{\gamma\theta_1}\right)^{\frac{1}{3}},$$

it has $$h_n \leq \frac{\gamma\theta_1 b_n^3(\xi) - \hat{R}_n T_c^2}{\upsilon P T_c^3},$$

completing the proof.

6.11 Proof of Corollary 5

Based on Lemma 4 and Theorem 2, first assuming the mobile has enough residual energy before offloading, it can be derived that the optimal time division is $$t^* = \begin{cases} t_0 & \text{if } t_0 \leq T_c \\ T_c, & \text{if } t_0 > T_c \end{cases} \quad \text{[Equation 55]}$$

with $t_0$ is $\rho(h)L$. With the constants:

$$y(h), \frac{vP_b h T_c + R}{y(h)},$$

c and c' defined before this Corollary, the energy savings in this channel is $$G_{\text{off}}(l, R, h) = \begin{cases} vP_b h T_c - y(h)l & \text{if } t_0 \leq T_c \\ -\left(2^{\frac{l}{BT_c}} - 1\right)\frac{\sigma^2}{h}T_c, & \text{if } t_0 > T_c \end{cases} \quad \text{[Equation 55]}$$

Specially, when $t_0 = T_c$, it gives $l = c$ and $$G_{\text{off}}(l, R, h) = \frac{BT_c y(h)}{\ln 2}.$$

Next, consider the mobile has limited residual energy R at the beginning of the channel, to guarantee the non-negative residual energy for the next channel, the maximum feasible data-input size $$\frac{vP_b h T_c + R}{y(h)}$$

and c' can be derived for the discussion of $$R \leq \frac{BT_c y(h)}{\ln 2}$$

and $$R > \frac{BT_c y(h)}{\ln 2}.$$

REFERENCES

[1] S. Sardellitti, G. Scutari, and S. Barbarossa, "Joint optimization of radio and computational resources for multicell mobile-edge computing," *arXiv preprint arXiv: 1412.8416*, 2014.

[2] L. Benini, A. Bogliolo, G. Paleologo, G. De Micheli, et al., "Policy optimization for dynamic power management," *Computer-Aided Design of Integrated Circuits and Systems, IEEE Transactions on*, vol. 18, no. 6, pp. 813-833, 1999.

[3] W. C. Brown, "The history of power transmission by radio waves," *IEEE Trans. on Microwave Theory and Techniques*, vol. 32, no. 9, pp. 1230-1242, September 1984.

[4] H. T. Dinh, C. Lee, D. Niyato, and P. Wang, "A survey of mobile cloud computing: architecture, applications, and approaches," *Wireless communications and mobile computing*, vol. 13, no. 18, pp. 1587-1611, 2013.

[5] L. Gkatzikis and I. Koutsopoulos, "Migrate or not? exploiting dynamic task migration in mobile cloud computing systems," *Wireless Communications, IEEE*, vol. 20, no. 3, pp. 24 32, 2013.

[6] B. Gurakan, O. Ozel, J. Yang, and S. Ulukus, "Energy cooperation in energy harvesting wireless communications," in *Proc. IEEE Intl. Symposium on Information Theory*, pp. 965 969, 2012.

[7] K. Huang and X. Zhou, "Cutting last wires for mobile communication by microwave power transfer," to appear in *IEEE Commun. Magazine* (Available: http://arxiv.org/abs/1408.3198).

[8] K. Huang and V. K. Lau, "Enabling wireless power transfer in cellular networks: architecture, modeling and deployment," *IEEE Trans. Wireless Commun.*, vol. 13, pp. 902-912, February 2014.

[9] S. Kosta, A. Aucinas, P. Hui, R. Mortier, and X. Zhang, "Thinkair: Dynamic resource allocation and parallel execution in the cloud for mobile code offloading," in *INFOCOM, 2012 Proceedings IEEE*, pp. 945-953, IEEE, 2012.

[10] S. Lee, R. Zhang, and K. Huang, "Opportunistic wireless energy harvesting in cognitive radio networks," *IEEE Trans. Wireless Commun.*, vol. 12, pp. 4788-4799, September 2013.

[11] D. W. Ng, E. S. Lo, and R. Schober, "Wireless information and power transfer: energy efficiency optimization in OFDMA systems," *IEEE Trans. Wireless Commun.*, vol. 12, pp. 6352-6370, December 2013.

[12] O. Ozel, K. Tutuncuoglu, J. Yang, S. Ulukus, and A. Yener, "Transmission with energy harvesting nodes in fading wireless channels: Optimal policies," *IEEE J. Select. Areas Commun.*, vol. 29, pp. 1732-1743, August 2011.

[13] P. Pillai and K. G. Shin, "Real-time dynamic voltage scaling for low-power embedded operating systems," in *ACM SIGOPS Operating Systems Review*, vol. 35, pp. 89-102, ACM, 2001.

[14] B. Prabhakar, E. Uysal Biyikoglu, and A. El Gamal, "Energy-efficient transmission over a wireless link via lazy packet scheduling," in *Proc. IEEE Infocom*, vol. 1, pp. 386-394, 2001.

[15] F. Yao, A. Demers, and S. Shenker, "A scheduling model for reduced cpu energy," in *Foundations of Computer Science, 1995. Proceedings., 36th Annual Symposium on*, pp. 374-382, IEEE, 1995.

[16] Y. Zhang, H. Liu, L. Jiao, and X. Fu, "To offload or not to offload: an efficient code partition algorithm for mobile cloud computing," in *Cloud Networking (CLOUDNET), 2012 IEEE 1st International Conference on*, pp. 80-86, IEEE, 2012.

[17] R. Zhang and C. Ho, "MIMO broadcasting for simultaneous wireless information and power transfer," *IEEE Trans. Wireless Commun.*, vol. 12, pp. 1989-2001, May 2013.

[18] S. Bi, C. K. Ho, and R. Zhang, "Wireless powered communication: opportunities and challenges," *IEEE Commun. Magazine.*, April 2014.

[19] T. D. Burd and R. W. Brodersen, "Processor design for portable systems," in *J. VLSI Signal Process*, pp. 203-221, August 1996.

[20] E. Cuervo, A. Balasubramanian, D.-k. Cho, A. Wolman, S. Saroiu, R. Chandra, and P. Bahl, "MAUI: making smartphones last longer with code offload," in *Proc. ACM MobiSys*, pp. 49-62, June 2010.

[21] D. Huang, P. Wang, and D. Niyato, "A dynamic offloading algorithm for mobile computing," *IEEE Trans. Wireless Commun.*, vol. 11, no. 6, pp. 1991-1995, June 2012.

[22] K. Kumar and Y.-H. Lu, "Cloud computing for mobile users: Can offloading computation save energy?," *Computer*, no. 4, pp. 51-56, 2010.

[23] J. R. Lorch and A. J. Smith, "Improving dynamic voltage scaling algorithms with pace," in *Proc. ACM SIGMETRICS*, vol. 29, pp. 50-61, June 2001.

[24] A. A. Nasir, X. Zhou, S. Durrani, and R. A. Kennedy, "Relaying protocols for wireless energy harvesting and information processing," *IEEE Trans. Wireless Commun.*, vol. 12, pp. 3622-3636, July 2013.

[25] P. Popovski, A. M. Fouladgar, and O. Simeone, "Interactive joint transfer of energy and information," *IEEE Trans. Commun.*, vol. 61, pp. 2086-2097, May. 2013.

[26] C. Shi, K. Habak, P. Pandurangan, M. Ammar, M. Naik, and E. Zegura, "COSMOS: computation offloading as a service for mobile devices," in *Proc. ACM MobiHoc*, pp. 287-296, August 2014.

[27] W. Yuan and K. Nahrstedt, "Energy-efficient soft realtime CPU scheduling for mobile multimedia systems," *ACM Trans. Computer Systems*, vol. 37, no. 5, pp. 149-163, 2003.

[28] W. Zhang, Y. Wen, K. Guan, D. Kilper, H. Luo, and D. O. Wu, "Energy-optimal mobile cloud computing under stochastic wireless channel," *IEEE Trans. Wireless Commun.*, vol. 12, no. 9, pp. 4569-4581, September 2013.

Device Configuration According to Embodiments of the Present Invention

Figure 13:
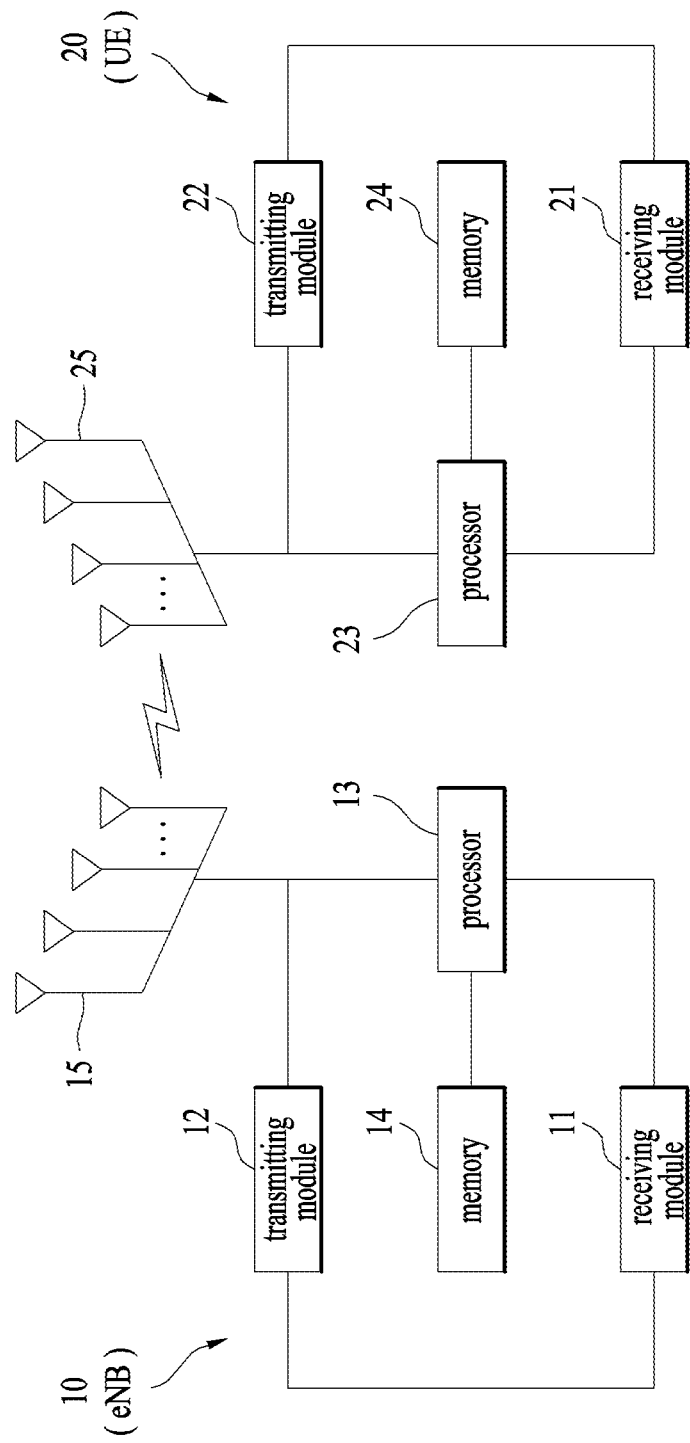
FIG. 13 is a block diagram of a transmission apparatus and a reception apparatus.

FIG. 13 is a diagram illustrating configurations of a transmission point device and a user equipment device according to embodiments of the present invention.

Referring to FIG. 13, a transmission point device 10 according to the present invention may include a receiving device 11, a transmitting device 12, a processor 13, a memory 14 and a plurality of antennas 15. The plurality of the antennas 15 may mean that the transmission point device supports MIMO transmission and reception. The receiving device 11 can receive various signals, data and information in uplink from a user equipment. The transmitting device 12 can transmit various signals, data and information in downlink to the user equipment. And, the processor 13 can control overall operations of the transmission point device 10.

The processor 13 of the transmission point device 10 according to one embodiment of the present invention can handle the details required in each of the embodiments mentioned in the foregoing description.

The processor 13 of the transmission point device 10 performs functions of operating and processing information received by the transmission point device 10, information to be externally transmitted by the transmission point device 10, and the like. The memory 14 can store the operated and processed information and the like for a prescribed period and can be substituted with such a component as a buffer (not shown in the drawing) and the like.

Referring to FIG. 13, a user equipment device 20 according to the present invention may include a receiving device 21, a transmitting device 22, a processor 23, a memory 24 and a plurality of antennas 25. The plurality of the antennas 15 may mean that the transmission point device supports MIMO transmission and reception. The receiving device 21 can receive various signals, data and information in downlink from an eNB. The transmitting device 22 can transmit various signals, data and information in uplink to the eNB. And, the processor 23 can control overall operations of the user equipment device 20.

The processor 23 of the user equipment device 20 according to one embodiment of the present invention can handle the details required in each of the embodiments mentioned in the foregoing description.

The processor 23 of the user equipment device 20 performs functions of operating and processing information received by the user equipment device 20, information to be externally transmitted by the user equipment device 20, and the like. The memory 24 can store the operated and processed information and the like for a prescribed period and can be substituted with such a component as a buffer (not shown in the drawing) and the like.

The detailed configurations of the transmission point device 10 and the user equipment device 20 can be implemented such that the details explained with reference to various embodiments of the present invention are independently applied or two or more embodiments of the present invention are simultaneously applied. And, redundant description shall be omitted for clarity.

The description of the transmission point device 10 in FIG. 13 may be equally applied to a relay node device as a downlink transmission entity or an uplink reception entity. And, the description of the user equipment device 20 in FIG. 13 may be equally applied to a relay node device as a downlink reception entity or an uplink transmission entity.

The embodiments of the present invention mentioned in the foregoing description can be implemented using various means. For instance, the embodiments of the present invention can be implemented using hardware, firmware, software and/or any combinations thereof.

In case of the implementation by hardware, a method according to each of the embodiments of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each of the embodiments of the present invention can be implemented by devices, procedures, and/or functions for performing the above-explained functions or operations. The software code is stored in a memory unit and can be driven by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

It will be apparent to those skilled in the art that the present invention may be embodied in other specific forms without departing from the spirit and essential characteristics of the invention. Thus, the above embodiments should be considered in all respects as exemplary and not restrictive. The scope of the present invention should be determined by reasonable interpretation of the appended claims and the present invention covers the modifications and variations of this invention that come within the scope of the appended claims and their equivalents. The present invention is non-limited by the embodiments disclosed herein but intends to give a broadest scope that matches the principles and new features disclosed herein. And, it is apparently understandable that an embodiment is configured by combining claims failing to have relation of explicit citation in the appended claims together or can be included as new claims by amendment after filing an application.

INDUSTRIAL APPLICABILITY

The above-described embodiments of the present invention can be applied to various kinds of mobile communication systems.

What is claimed is:

1. A method of an input data processing via a local computing or offloading based on power harvesting by a user equipment (UE) in a wireless communication system, the method comprising:
   receiving a signal from a base station (BS) and saving energy that is delivered via the signal;
   determining whether a local computing is feasible and whether an offloading is feasible; and
   performing one of the local computing or the offloading according to the determination,
   wherein the UE determines the offloading is feasible when following equation is met:

$$P_b h^2 \geq a''$$

wherein h is a channel gain, $P_b$ is a BS transmission power, $$a'' = \frac{\sigma^2}{\upsilon}\left\{1 + \left[\frac{L\ln 2}{BT} + W\left(-e^{-1-\frac{L\ln 2}{BT}}\right)\right] \times \exp\left(\frac{L\ln 2}{BT} + W\left(-e^{-1-\frac{L\ln 2}{BT}}\right) + 1\right)\right\},$$

$\sigma^2$ is the variance of complex white Gaussian noise, $\upsilon$ represents an energy conversion efficiency, B is a channel bandwidth, T is a time duration for receiving the signal and offloading, L is the number of bits of input data for computation, and W is a Lambert function defined as a solution for $W(x)e^{W(x)}=x$.

2. The method of claim 1, wherein the UE determines the local computing is feasible when following equation is met:

$$a \leq P_b h$$

wherein h is the channel gain, $P_b$ is the BS transmission power, $$a = \frac{\gamma N^3}{\upsilon T^3},$$

N is an upper bounds of the number of CPU cycles, $\gamma$ is a constant determined by a switched capacitance, and $\upsilon$ represents the energy conversion efficiency.

3. The method claim 2, wherein the UE calculates an input data, when the UE determines the local computing is feasible.

4. The method of claim 1, wherein if both the local computing and the offloading are feasible, the method further comprises:
   comparing an energy saving of the local computing and an energy saving of the offloading.

5. The method of claim 4, wherein the comparing is represented as $$\left(\sum_{k=1}^{N} p_k^{\frac{1}{3}}\right)^3 \leq \theta \leq N^2 \sum_{k=1}^{N} p_k,$$

$$y(h) = \left(\frac{\sigma^2}{Bh}\ln 2\right)\exp\left(W\left(\frac{\upsilon P_b h^2}{\sigma^2 e} - \frac{1}{e}\right) + 1\right),$$

wherein $\theta$ satisfies $$\Delta S = \frac{\gamma \theta}{T^2} - y(h)L,$$

h is the channel gain, $P_b$ is the BS transmission power, $\sigma^2$ is the variance of complex white Gaussian noise, $\upsilon$ represents the energy conversion efficiency, B is the channel bandwidth, W is the Lambert function defined as the solution for $W(x)e^{W(x)}=x$, N is an upper bounds of the number of CPU cycles, and $p_k$ is a probability that the k-th CPU cycle is executed.

6. The method of claim 5, wherein the offloading is selected, when one of following conditions is met:

$$T \leq \frac{\gamma \theta}{y(h)L}$$

or $$P_b \leq \frac{\sigma^2}{\upsilon h^2}(1 + ea'''\ln a'''),$$

wherein T is the time duration for receiving the signal and the offloading, L is the number of bits of the input data for computation, and $$a''' = \frac{Bh\gamma\theta}{eT^2\sigma^2 L\ln 2}.$$

7. A user equipment (UE) processes an input data via a local computing or offloading based on power harvesting in a wireless communication system, the UE comprising:
   a receiving device; and
   a processor,
   wherein the processor is configured to receive a signal from a base station (BS) and save energy that is delivered via the signal, determine whether a local computing is feasible and whether an offloading is feasible, and perform one of the local computing or the offloading according to the determination, and
   wherein the processor is further configured to determine the offloading is feasible when following equation is met:

$$P_b h^2 \geq a''$$

wherein h is a channel gain, $P_b$ is a BS transmission power, $$a'' = \frac{\sigma^2}{\upsilon}\left\{1 + \left[\frac{L\ln 2}{BT} + W\left(-e^{-1-\frac{L\ln 2}{BT}}\right)\right] \times \exp\left(\frac{L\ln 2}{BT} + W\left(-e^{-1-\frac{L\ln 2}{BT}}\right) + 1\right)\right\},$$

$\sigma^2$ is the variance of complex white Gaussian noise, $\upsilon$ represents an energy conversion efficiency, B is a channel bandwidth, T is a time duration for receiving the signal and the offloading, L is the number of bits of input data for computation, and W is a Lambert function defined as a solution for $W(x)e^{W(x)} = x$.

8. The UE of claim 7, wherein the UE determines the local computing is feasible when following equation is met:

$a \le P_b h$ wherein h is the channel gain, $P_b$ is the BS transmission power, $$a = \frac{\gamma N^3}{\upsilon T^3},$$

N is an upper bounds of the number of CPU cycles, $\gamma$ is a constant determined by a switched capacitance, and $\upsilon$ represents the energy conversion efficiency.

9. The UE claim 8, wherein the UE calculates an input data, when the UE determines the local computing is feasible.

10. The UE of claim 7, wherein if both the local computing and the offloading are feasible, the method further comprises:
comparing an energy saving of the local computing and an energy saving of the offloading.

11. The UE of claim 10, wherein the comparing is represented as $$\Delta S = \frac{\gamma \theta}{T^2} - y(h)L,$$

wherein $\theta$ satisfies $$\left(\sum_{k=1}^{N} p_k^{\frac{1}{3}}\right)^3 \le \theta \le N^2 \sum_{k=1}^{N} p_k,$$

$$y(h) = \left(\frac{\sigma^2}{Bh}\ln 2\right)\exp\left(W\left(\frac{\upsilon P_b h^2}{\sigma^2 e} - \frac{1}{e}\right) + 1\right),$$

h is the channel gain, $P_b$ is the BS transmission power, $\sigma^2$ is the variance of complex white Gaussian noise, $\upsilon$ represents the energy conversion efficiency, B is the channel bandwidth, W is the Lambert function defined as the solution for $W(x)e^{W(x)} = x$, N is an upper bounds of the number of CPU cycles, and $p_k$ is a probability that the k-th CPU cycle is executed.

12. The UE of claim 11, wherein the offloading is selected, when one of following conditions is met:

$$T \le \frac{\gamma \theta}{y(h)L}$$

or $$P_b \le \frac{\sigma^2}{\upsilon h^2}(1 + ea''' \ln a'''),$$

wherein T is the time duration for receiving the signal and the offloading, L is the number of bits of input data for computation, and $$a''' = \frac{Bh\gamma\theta}{eT^2\sigma^2 L\ln 2}.$$

* * * * *